(12) United States Patent
Hamamoto et al.

(10) Patent No.: US 6,840,477 B2
(45) Date of Patent: Jan. 11, 2005

(54) FLUTTERING WING-OPERATED FLYING MOVING APPARATUS

(75) Inventors: Masaki Hamamoto, Sakurai (JP); Yoshiji Ohta, Kashiwara (JP); Keita Hara, Kashihara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/085,181

(22) Filed: Feb. 27, 2002

(65) Prior Publication Data

US 2002/0117583 A1 Aug. 29, 2002

(30) Foreign Application Priority Data

Feb. 27, 2001 (JP) ........................................ 2001-052057
Nov. 14, 2001 (JP) ........................................ 2001-349132

(51) Int. Cl.⁷ .............................................. B64C 33/00
(52) U.S. Cl. ........................................ 244/22; 244/72
(58) Field of Search ............................... 244/22, 11, 28, 244/72

(56) References Cited

U.S. PATENT DOCUMENTS

| | | | | |
|---|---|---|---|---|
| 852,239 | A | * | 4/1907 | Reckweg |
| 1,980,002 | A | * | 11/1934 | Savidge |
| 2,017,534 | A | * | 10/1935 | Gray |
| 4,712,749 | A | * | 12/1987 | Fox |
| 4,964,598 | A | * | 10/1990 | Berejik et al. |
| 5,067,674 | A | * | 11/1991 | Heyche et al. |
| 5,163,861 | A | * | 11/1992 | Van Ruymbeke |
| 5,716,032 | A | * | 2/1998 | McIngvale |
| 6,445,333 | B1 | * | 9/2002 | Tanaka |
| 6,550,716 | B1 | * | 4/2003 | Kim et al. |
| 6,659,397 | B1 | * | 12/2003 | Charron ................... 244/72 |
| 6,685,137 | B2 | * | 2/2004 | Darbyshire ............ 244/75 R |

FOREIGN PATENT DOCUMENTS

| | | | | |
|---|---|---|---|---|
| FR | 679141 | * | 4/1930 | .................. 244/22 |
| JP | 05-282040 A | | 10/1993 | |
| JP | 06-099369 A | | 4/1994 | |
| JP | 06-305455 A | | 11/1994 | |
| JP | 09-272083 A | | 10/1997 | |

* cited by examiner

Primary Examiner—Tien Dinh
(74) Attorney, Agent, or Firm—David G. Conlin; David A. Tucker; Edwards & Angell, LLP

(57) ABSTRACT

On a main body portion of a fluttering apparatus, a wing (left wing) is formed which has a front wing shaft, a rear wing shaft and a wing film provided spreading over the front and rear wing shafts. Further, on the main body portion, a rotary actuator for driving the front wing shaft and a rotary actuator for driving the rear wing shaft are mounted. The front (rear) wing shafts reciprocate in a plane orthogonally crossing an axis of rotation with the actuator serving as the fulcrum. Thus, a moving apparatus is obtained which has superior maneuverability and can move not hindered by any obstacle or geometry both indoors and outdoors.

19 Claims, 33 Drawing Sheets

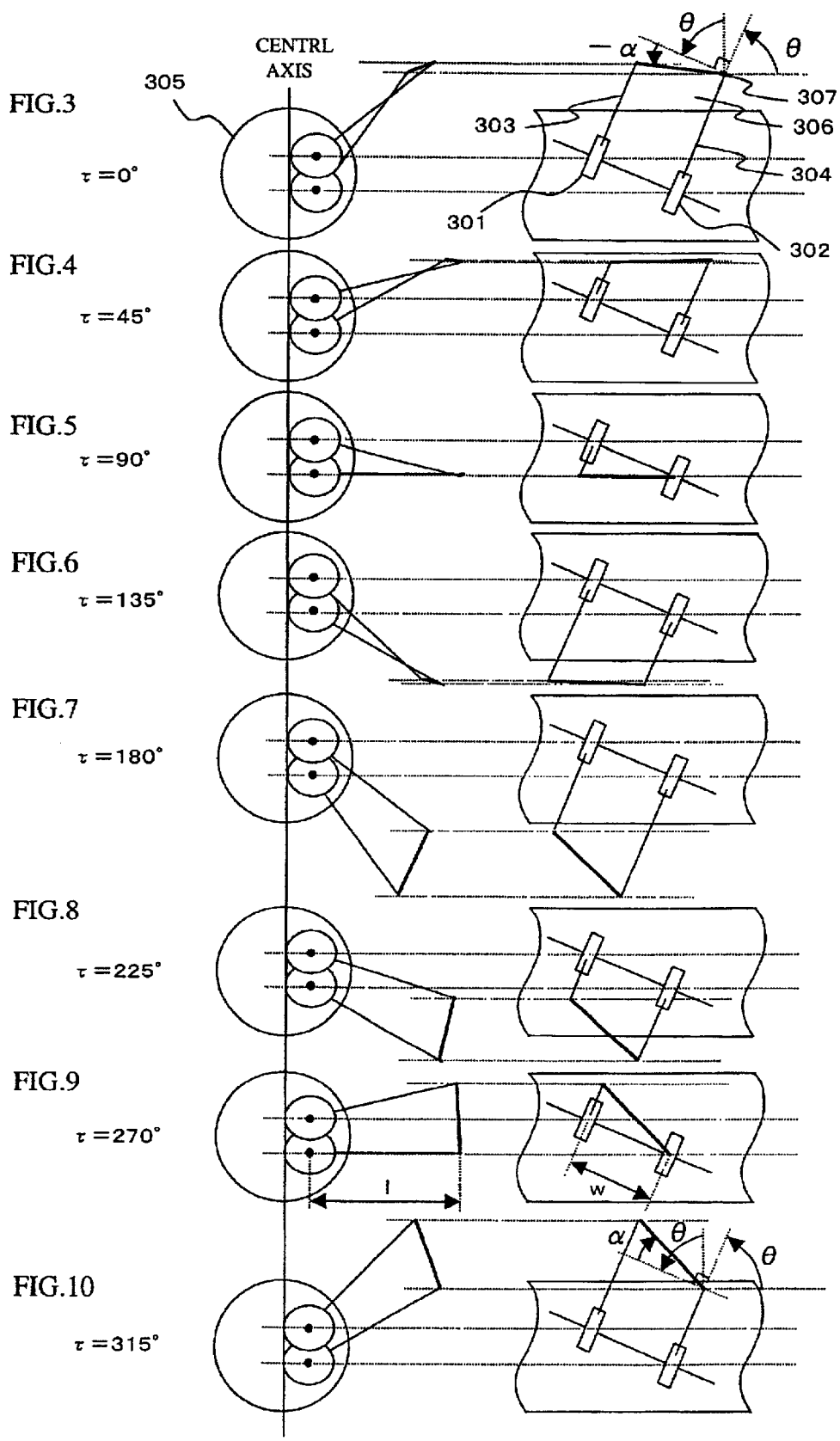

|  |  | $x''$ | $+x''$ | $-z''$ | $+z''$ | $-\theta_y''$ | $+\theta_y''$ |
|---|---|---|---|---|---|---|---|
| S1 | stroke $\theta$ ↑ |  |  | ● |  |  |  |
|  | stroke $\theta$ ↓ |  |  |  | ● |  |  |
|  | $-d\theta/dt$ ↑ |  |  | ● |  |  |  |
|  | $-d\theta/dt$ ↓ |  |  |  | ● |  |  |
|  | $-d\alpha/d\theta > d\alpha_{th}$ | ● |  |  |  |  |  |
|  | $-d\alpha/d\theta < d\alpha_{th}$ |  | ● |  |  |  |  |
|  | $\beta$ is about vertical to sroke direction. |  |  | ● |  |  |  |
|  | $\beta$ is not vertical to sroke direction. |  |  |  | ● |  |  |
|  | $\beta > 0$ | ● |  |  |  |  |  |
|  | $\beta < 0$ |  | ● |  |  |  |  |
| S2 | $-d\beta/dt$ ↑ | ● |  | ● |  | ● |  |
|  | $-d\beta/dt$ ↓ |  | ● |  | ● |  | ● |
| S3 | stroke $\theta$ ↑ |  |  |  | ● |  |  |
|  | stroke $\theta$ ↓ |  |  | ● |  |  |  |
|  | $d\theta/dt$ ↑ |  |  |  | ● |  |  |
|  | $d\theta/dt$ ↓ |  |  | ● |  |  |  |
|  | $d\alpha/d\theta > d\alpha_{th}$ |  | ● |  |  |  |  |
|  | $d\alpha/d\theta < d\alpha_{th}$ | ● |  |  |  |  |  |
|  | $\beta$ is about vertical to sroke direction. |  |  |  | ● |  |  |
|  | $\beta$ is not vertical to sroke direction. |  |  | ● |  |  |  |
| S4 | $d\beta/dt$ ↑ | ● |  |  | ● |  | ● |
|  | $d\beta/dt$ ↓ |  | ● | ● |  | ● |  |

FIG. 38

|  | RIGHT ACTUATOR | | LEFT ACTUATOR | |
|---|---|---|---|---|
|  | DRIVING FREQ. | MOTION PATTERN | DRIVING FREQ. | MOTION PATTERN |
| UP | 35Hz | B | 35Hz | B |
| DOWN | 25Hz | B | 25Hz | B |
| GO FORWARD | 30Hz | A | 30Hz | A |
| HOVER | 30Hz | B | 30Hz | B |
| TURN RIGHT | 30Hz | B | 30Hz | A |
| TURN LEFT | 30Hz | A | 30Hz | B |

FIG. 39

FLUTTERING WING-OPERATED FLYING MOVING APPARATUS

BACKGROUND OF THE INVENTION

1. Field of the Invention

The present invention relates to a moving apparatus and, more specifically, to a moving apparatus that can fly, by generating a prescribed force through up and down strokes of wings.

2. Description of the Background Art

Recently, there has been a demand for an activity of a moving apparatus such as a robot in an environment that is not well maintained beforehand and have various and many obstacles, such as human living environment or at a disaster site.

A robot having wheels for movement has been proposed (for example, in Japanese Patent Laying-Open No. 5-282040) as one of conventional moving apparatuses. Multi-joint moving apparatuses have been well studied. Further, an insect type robot having six legs for improved stability has also been developed (as disclosed, for example, in Japanese Patent Laying-Open No. 6-99369). Further, two-leg autonomous walking robot referred to as a humanoid type robot has also been developed for improved maneuverability (as disclosed, for example, in Japanese Patent Laying-Open No. 9-272083). A robot having a track has also been developed (as disclosed, for example, in Japanese Patent Laying-Open No. 6-305455).

In any of these moving apparatuses, moving operation is performed while the weight of the moving apparatus itself is supported by bringing a part of the device to be in contact with the ground.

A moving apparatus such as a helicopter has also been known that can move in the air while avoiding obstacles on the ground.

The conventional moving apparatuses, however, have the following problems. First, at home, there are a large number of obstacles positions of which are not fixed but changed frequently (for example, family members, a pet, chairs, ornaments and toys), different from factories or offices of well-maintained environment. Further, there may be a narrow passage, stairs, or a step between rooms at home.

In the conventionally developed moving apparatuses, there is a trade-off between "ability to overcome a step" and "ability to go through a small space." When wheels are used for moving a moving apparatus, for example, movement is achieved by friction force between the wheels and the contact surface. The friction force is in proportion to the normal reaction at the contact surface.

When the radius of the wheel is D, the normal reaction will be 0 at a step higher than the radius D. Therefore, friction force cannot be obtained where there is a step higher than the radius D, and hence the moving apparatus cannot overcome the step.

Therefore, when a moving apparatus having wheels that can move over every hole and corner in an environment, the radius D of the wheel must be larger than the maximum step in the environment.

When the radius D of the wheel is increased to overcome a higher step, the ability to go through a small space lowers. Specifically, the diameter of the wheel having the radius D is 2D, and the entire length of the moving apparatus having the wheel becomes larger than the diameter 2D of the wheel. In order to go through a space that is bent at a right angle, it is necessary that the width of the space must be larger than about 0.71 times the radius D of the wheel.

In order to turn the moving apparatus at the-site, there must be no obstacle in the area at least having the radius D. Under the circumstances, applications of the conventional moving apparatuses having wheels have been limited to such an environment that has relatively small steps, for which wheels of relatively small diameter are used, or such an environment that is almost free of obstacles, for which relatively large wheels are used.

For a moving apparatus having multi-articulated joints, the length of the legs must be approximately the same as the step. For stable walking, a distance approximately the same as the length of the leg is necessary as a distance between grounding points of one leg and another. Therefore, as in the case of the moving apparatuses using wheels, the trade-off between "the ability to overcome a step" and "the ability to go through a small space" cannot be eliminated even by the moving apparatuses using legs.

In the two-leg walking robot disclosed in Japanese Patent Laying-Open No. 9-272083 as a moving apparatus, in order to go up stairs having the step of h, the maximum length of the leg must be longer than the step h. When a collapsible structure is adopted for the legs so that the size of the robot can be made smaller than the step h, the structure of the moving apparatus becomes very complicated.

Arrangement of furniture differs household by household. Even in one house, positions of chairs, for example, may be changed at meals. Namely, positions of furniture and the like are not fixed. Most pieces of the furniture are arranged on the floor.

When a moving apparatus is to be moved while avoiding such obstacles, the obstacles must be detected and a rout must be searched on real time basis.

When the moving apparatus is adapted to have such a function, a detecting device, an operating device and the like occupy a large volume in the moving apparatus, hindering reduction in size of the moving apparatus. As a result, it becomes impossible for the moving apparatus to go through a small space.

At a disaster site or general field, the environment is very much different from that of a household that is relatively in order. Namely, there are unpaved roads, wasteland, field of grass, river, pond, cliff, or a hill of rubble. To move freely in such an environment has been almost impossible for conventional moving apparatuses using wheels, legs and the like.

Let us consider moving in the air to avoid obstacles. The moving apparatus such as an airplane stalls unless it is moving at a prescribed speed or higher, and hovering is not possible. Though hovering is possible for a moving apparatus such as a helicopter having a rotor, good maneuverability (speedy transition between the stationary state and the usual flight) cannot be attained because of large torque. As described above, conventional moving apparatuses having wheels, legs or the like cannot move freely while avoiding obstacles at home or at a disaster site. Further, conventional moving apparatuses such as helicopters cannot attain superior maneuverability.

SUMMARY OF THE INVENTION

An object of the present invention is to provide a moving apparatus having superior maneuverability, which can move in an environment with much obstacles such as at home or a general field, while not restricted by such obstacles.

The moving apparatus in accordance with the present invention includes a flying body including a wing portion for flying in a space where a fluid exists, a driving portion and a main body. The driving portion causes a down stroke by which the wing portion is moved downward from above, and an up stroke by which the wing portion moves upward from below. The wing portion is attached to the main body, and the driving portion is mounted on the main body. As a time average of the series of down stroke and up stroke operations, vertically upward force among the forces exerted by the fluid to the wing portion becomes larger than the gravity acting on the flying body.

By this structure, as a time average from the down stroke to the up stroke of fluttering operation of the wing portion, vertically upward force among the forces exerted by the fluid on the wing portion becomes larger than the gravity acting on the flying body, and hence buoyancy acts on the flying body. As a result, the flying body can move without touching the ground.

For buoyancy to act on the flying body, it is desirable that the volume of a space in which the wing portion moves in the down stroke is larger than the volume of the space in which the wing moves in the up stroke. When the buoyancy is balanced with the gravity acting on the flying body, hovering becomes possible, that is, the device can stay in the air apart from the ground.

It is desirable that the flying body is used as moving means for performing a prescribed work indoors, or moving means for performing prescribed work outdoors.

As the flying body obtains buoyancy and can move apart from the ground, it can move in a house where there are various and many objects such as pieces of furniture of which positions are changed with time, while avoiding such obstacles. Thus it can easily perform prescribed work such as monitoring the condition of each room. When used outdoors, the flying body can move freely without any influence of obstacles at a disaster site or geography of general field, for example, and it can easily perform a prescribed work such as information collection.

Specifically, the wing portion has a wing body and a wing shaft supporting the wing body. Desirably, the driving portion changes a torsion angle formed by a tip end portion of the wing body and a phantom prescribed reference plane, by driving the wing shaft.

Thus, magnitude or direction of the fluid force exerted by the fluid on the wing portion changes, so that the flying body can move upward, downward, forward or backward.

In order to make the volume of the space in which the wing portion moves in a down stroke larger than the volume of the space in which the wing portion moves in an up stroke, it is necessary for the driving portion to make different the torsion angle for the down stroke and the torsion angle for the up stroke.

Further, it is desirable that the driving portion changes with time the torsion angle.

This enables smooth change of the attitude of the wing portion, avoiding abrupt action of the fluid force on the wing portion.

The wing shaft includes one wing shaft and the other wing shaft, the wing body includes a film formed bridging between the one wing shaft and the other wing shaft, and it is desirable for the driving portion to drive one wing shaft and the other wing shaft separately.

Here, by driving the one wing shaft and the other wing shaft separately, the torsion angle can easily be changed.

Desirably, the wing shaft performs a reciprocating operation on a phantom plane with the driving portion being a fulcrum, the main body extends in one direction, and an elevation formed by the direction of extension of the main body and the phantom plane is variable.

Here, the degree of freedom of fluttering motion becomes higher, realizing more complicated fluttering motion. By increasing the elevation and controlling torsion angle, flight at higher speed becomes possible. By making the elevation substantially 0°, hovering with high maneuverability like a humming bird becomes possible.

Specifically, it is desired that the wing portion has a main shaft and a wing body formed from the main shaft in a direction approximately orthogonal to the direction of extension of the main shaft, and that the driving portion changes torsion angle formed by a phantom plane in contact with the wing body and a prescribed phantom reference plane including the main shaft, by driving the main shaft.

Thus, magnitude or direction of the fluid force exerted by the fluid on the wing portion is changed, so that the flying body can move upward, downward, forward or backward.

In order to change the attitude of the wing portion by such a main shaft, it is desirable that the driving portion includes an actuator having at least three degrees of freedom.

Desirably, the wing portion is formed on one side and the other side of approximately the center of the main body, and that the driving portion drives the wing portion formed on one side and the wing portion formed on the other side separately.

Here, the attitude of the wing portion formed one side and the wing portion formed on the other side can be changed separately, and hence the direction of the flying body can be changed easily.

Further, it is desirable that the apparatus further includes a sensor portion for grasping environmental conditions, a memory portion for storing information, or a communication portion for transmitting/receiving information.

When a sensor portion is provided, it becomes possible to obtain information of position, attitude or velocity of the flying body, position or moving velocity of obstacles around the flying body, or environmental information such as temperature or brightness, enabling more appropriate fluttering control. When a memory portion is provided, it becomes possible to store the obtained environmental information, and therefore, the flying body comes to have learning function. When a communication portion is provided, information can be exchanged between a plurality of flying bodies and a base station, and by exchanging the obtained information, coordinated activity between each of the plurality of flying bodies can readily be realized.

Further, it is desired that one wing shaft and the other wing shaft be formed with a space therebetween being widened toward the tip end of the one wing shaft and the other wing shaft.

When the one wing shaft and the other wing shaft are formed with the space therebetween being widened toward the tip end of each of the shafts, the torsion angle can be changed more quickly, utilizing elasticity of the wing shafts or tension of the film formed bridging between the wing shafts.

Further, when one wing shaft and the other wing shaft are configured to have a degree of freedom such that the wing shafts can pivot about respective axes, the wing shafts can pivot such that portions of the wing film coupled to one wing shaft and to the other wing shaft are approximately opposed to each other, even when positional relation between the one and the other wing shafts changed. Therefore, load on the driving apparatus driving the wing shafts can be reduced, enabling efficient control.

Preferably, the moving apparatus of the present invention realizes a target manner of movement by time-sequentially combining basic operations in accordance with basic operations pattern data. This simplifies control of the manner of movement.

The moving apparatus of the present invention further includes storing means for storing combinations of the aforementioned basic operations pattern data and driving manner data related to the manner of driving of the driving portion realizing the basic operations pattern data. This enables speedy determination of the manner of driving by the driving portion.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 3 to 10 are illustrations showing the first to eighth states of fluttering operation by the fluttering apparatus of the first embodiment.

FIG. 38 is a table representing correspondence between change in the manner of fluttering of a left wing and resulting change in the state of flight.

FIG. 39 is a table representing combinations of patterns of the manner of fluttering to realize basic operations of fluttering flight.

DESCRIPTION OF THE PREFERRED EMBODIMENTS

First Embodiment

Figure 1:
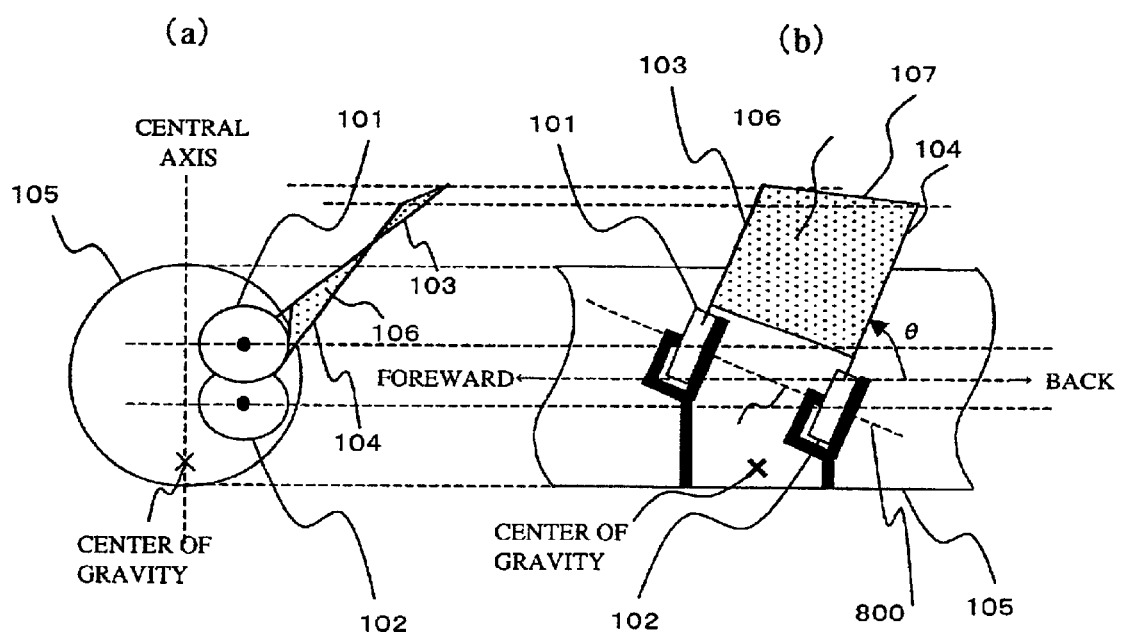
FIG. 1 is an illustration of a fluttering apparatus in accordance with a first embodiment of the present invention, including a partial plan view (a) and a partial side view (b).
Figure 2:
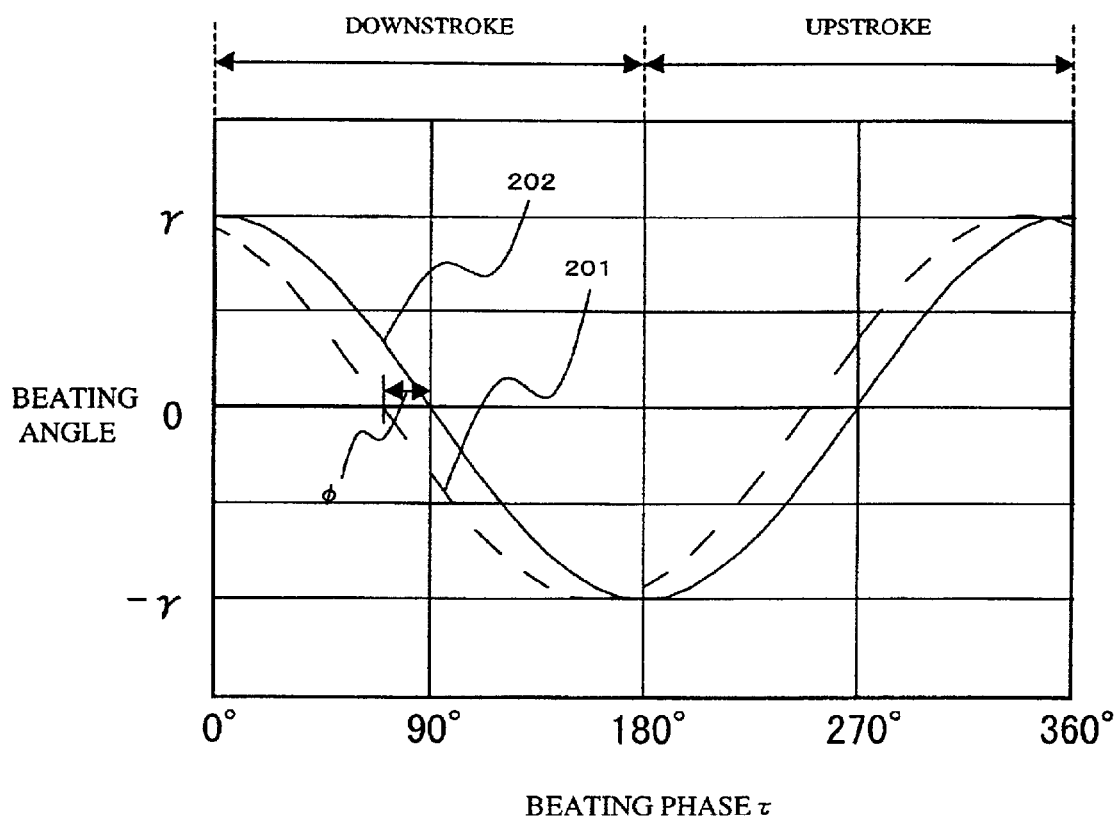
FIG. 2 is a graph representing a relation between beating motion and a phase of the beating motion, in the first embodiment.

A fluttering apparatus as the moving apparatus in accordance with the first embodiment of the present invention will be described. FIG. 1 shows the fluttering apparatus having two wing shafts as the wing portion, in which (a) is a front view of the fluttering apparatus and (b) is a left side view, viewed from the front face of the fluttering apparatus.

Though only the left wing viewed from the front face of the fluttering apparatus is shown in (a) and (b) of FIG. 1, actually, a right wing is also formed in line symmetry with respect to the central axis of a main body 105. For simplicity of description, it is assumed that an axis (main body axis 801) along the direction of extension of main body 105 is in a horizontal plane, and that a central axis 802 passing through the center of gravity is kept in the vertical direction.

As can be seen from (a) and (b) of FIG. 1, on main body 105 of the fluttering apparatus, a wing (left wing) is formed, which has a front wing shaft 103 and a rear wing shaft 104 and a wing film 106 provided bridging across the front and rear wing shafts 103 and 104.

Further, a rotary actuator 101 for driving front wing shaft 103 and a rotary actuator 102 for driving rear wing shaft 104 are mounted on main body 105. Such an arrangement of actuators 101 and 102 as well as the shape of the wing including front wing shaft 103, rear wing shaft 104 and wing film 106 are not limited to those described herein, provided that the flight function is assured.

Further, in the fluttering apparatus, when the cross sectional shape of the wing is adapted to protrude vertically upward, a reaction as well as lift are generated for the flight in the horizontal direction, resulting in larger buoyancy force.

The position of center of gravity of the fluttering apparatus is set to be lower than the point of application of the force received by the wing from ambient fluid to the actuator, to enhance stability of the fluttering apparatus. When quick change of the attitude of the fluttering apparatus is of higher priority, it is desirable that the center of gravity and the point of application are substantially the same. In that case, difference of the force exerted by the fluid on the left and right wings necessary for attitude control becomes smaller, and hence change in attitude of the fluttering apparatus becomes easier.

Two rotary actuators 101 and 102 have a common axis of rotation 800. The axis of rotation 800 forms a prescribed angle (90°−θ) from the axis of the main body. Front (rear) wing shaft 103, 104 performs a reciprocating operation in a plane that orthogonally crosses the axis of rotation 800, with the actuator 101, 102 being a fulcrum. The angle formed by the plane orthogonally crossing the axis of rotation 800 and the axis 801 of the main body is the elevation θ.

In order to ensure both mechanical strength and light weight, main body 105 should desirably be formed by polyethylene terephthalate (PET) molded to a cylindrical shape. The material and the shape, however, are not limiting.

An ultrasonic progressive wave actuator using a piezoelectric element is desirable as the actuators 101 and 102, as it has large activation torque, enables reciprocating operation in a simple manner and has a simple structure. Such an actuator is classified into two types, that is, rotary actuator and linear actuator. In the example shown in (a) and (b) of FIG. 1, rotary actuators are used.

A method of directly driving the wing by an ultrasonic element using progressive wave will be mainly discussed in the following. The mechanism for driving the wing and the type of the actuator used therefor, however, are not limited to those described with respect to the present embodiment.

Figure 11:
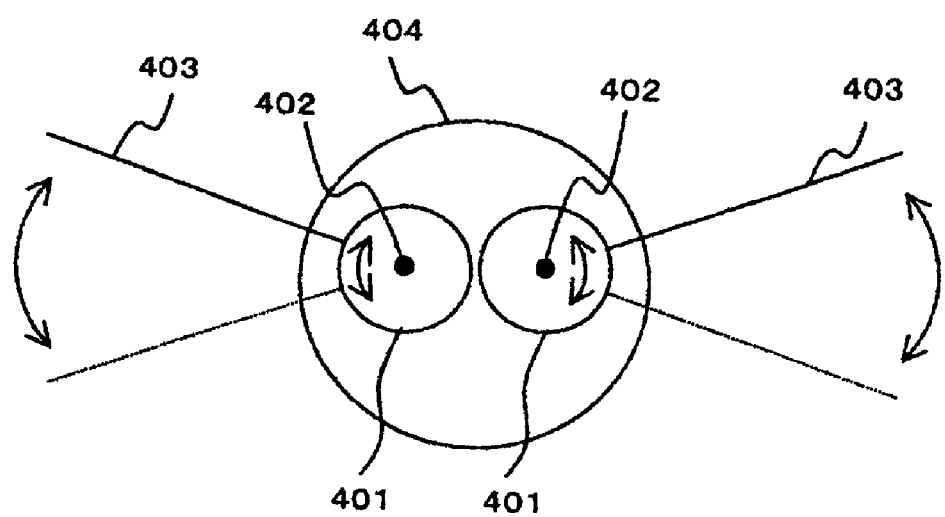
FIG. 11 is a schematic front view showing the fluttering apparatus in accordance with a modification of the first embodiment.

As the rotary actuator, a rotary actuator 401 shown in FIG. 11, for example, may be used, other than the rotary actuators 101 and 102 shown in (a) and (b) of FIG. 1.

In the fluttering apparatus shown in FIG. 11, a wing 403 is attached to a rotary actuator 401 mounted on main body 404. Wing 403 performs a reciprocating operation about the rotation axis 402 of rotary actuator 401.

Figure 12:
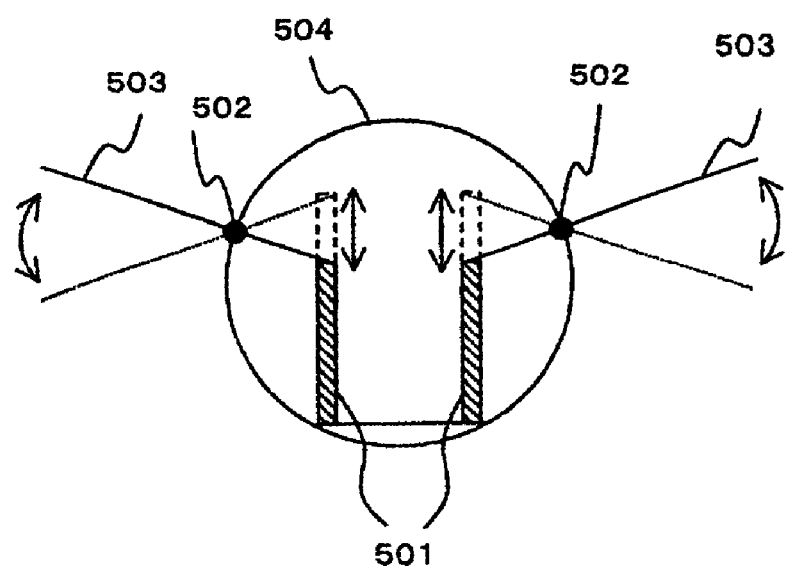
FIG. 12 is a schematic front view showing the fluttering apparatus in accordance with another modification of the first embodiment.
Figure 13:
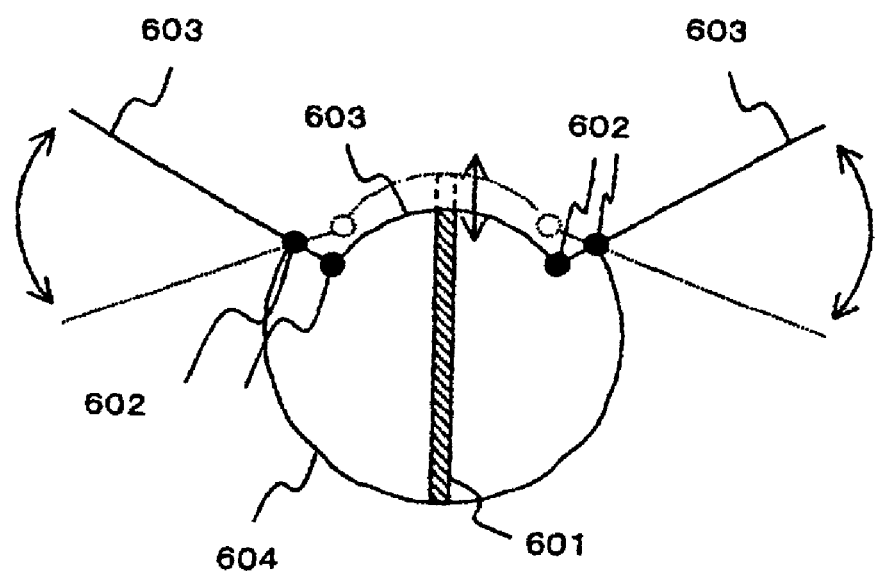
FIG. 13 is a schematic front view showing the fluttering apparatus in accordance with a still further modification of the first embodiment.

As a mechanism for driving the wing, a mechanism having an exoskeleton structure and a linear actuator combined, as described in Japanese Patent Laying-Open No. 5-1695675, may be applied to provide such a fluttering apparatus as shown in FIG. 12 or 13, for example.

In the fluttering apparatus shown in FIG. 12, a front wing shaft or a rear wing shaft 503 is connected to one end of a linear actuator 501. Motion of linear actuator 501 is transmitted to the front or rear wing shaft 503 through a hinge 502 attached to main body 504, so that fluttering motion occurs. The fluttering motion is conceived from the fluttering motion of a dragonfly, the wing of which is directly driven by the muscle.

In the fluttering apparatus shown in FIG. 13, the main body is divided into an upper main body 603 and a lower main body 604. Motion of a linear actuator fixed on lower main body 604 is transmitted to upper main body 603. The motion of upper main body 603 is transmitted to the front or rear wing shaft 603 through a hinge 602, and the fluttering motion occurs. This fluttering operation is conceived from the fluttering operation of a bee, not the dragonfly.

In the fluttering apparatus shown in FIG. 13, the left and right wing shafts 603 are simultaneously driven by one actuator 601, and therefore, separate driving of left and right wing shafts is not possible. Therefore, delicate flight control is impossible. However, as the number of actuators can be reduced, weight and power consumption can be reduced.

In the fluttering apparatus shown in (a) and (b) of FIG. 1, front wing shaft 103 and rear wing shaft 104 are respectively connected to rotary actuators 101 and 102. A wing film 106 is provided between the front and rear wing shafts 103 and 104. The wing film 106 has initial stress in a direction of contraction in its plane, which serves to enhance stiffness of the entire wing.

In order to reduce weight, front and rear wing shafts 103 and 104 are formed to have a hollow structure, from carbon graphite. Thus, the front and rear wing shafts 103 and 104 have elasticity, and front and rear wing shafts 103 and 104 are deformable by the tension of wing film 106.

Figure 14:
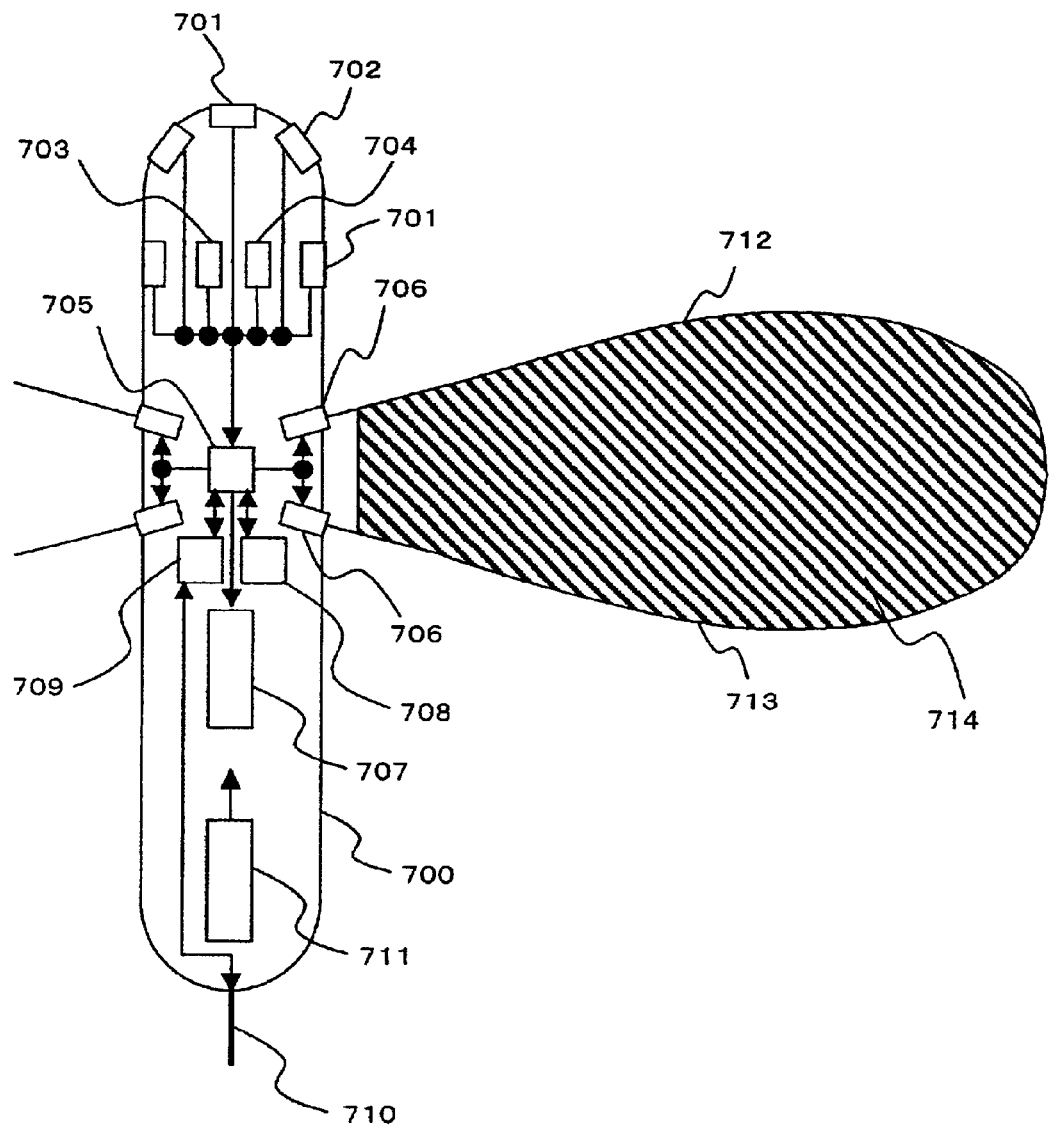
FIG. 14 is a schematic plan view showing a structure of the fluttering apparatus shown in FIG. 1, in accordance with the first embodiment.

FIG. 14 shows an overall structure of the fluttering apparatus of the present invention. The wing on the left side along the direction of progress (upward on the sheet) is not shown.

On a main body 700, an ultrasonic sensor 701, an infrared sensor 702, an acceleration sensor 703 and an angular acceleration sensor 704 are arranged. Results of detection by these sensors are transmitted to a fluttering control portion 705. Fluttering control portion 705 processes information such as distance between the fluttering apparatus and an obstacle or a person near the apparatus, from the results detected by the ultrasonic sensor 701 or infrared sensor 702. Further, information such as the state of flight, target position or attitude of the fluttering apparatus is processed from the results detected by acceleration sensor 703 or angular acceleration sensor 704, and driving control of left and right actuators 706 and a center of gravity control portion 707 is determined.

Though ultrasonic sensor 701 and infrared sensor 702 are used as means for detecting an obstacle existing around the fluttering apparatus and acceleration sensor 703 and angular acceleration sensor 704 are used as means for detecting position and attitude of the fluttering apparatus, the sensors are not limited to these, and any sensor that can measure environmental conditions, position and attitude of the present fluttering apparatus may be used.

For example, the attitude of the fluttering apparatus can be calculated from acceleration information obtained by arranging two acceleration sensors capable of measuring acceleration in three axial directions orthogonally crossing with each other, arranged at different positions of main body 700. Further, it is possible to calculate position and attitude of the fluttering apparatus by providing a magnetic field distribution in the space in which the fluttering apparatus moves, and by detecting the magnetic field distribution by a magnetic sensor.

In FIG. 14, sensors represented by acceleration sensor 703 and angular acceleration sensor 704 are shown as components separate from fluttering control portion 705. In order to reduce weight, the sensors may be formed integrally with and on the same substrate as fluttering control portion 705 by micromachining technique, for example.

Though wing drive is open-loop controlled in the present fluttering apparatus, closed-loop control is also possible by providing an angle sensor of the wing at a root of the wing and using angle information obtained from the angle sensor.

When flow of the fluid in the space where the apparatus flies is known and flight is possible in accordance with a predetermined method of fluttering, the sensors listed above are not essential.

Fluttering control portion 705 is connected to a memory portion 708, and existing data necessary for fluttering control may be read from memory portion 708. Further, information obtained by sensors 701 to 704 may be fed to memory portion 708 and to rewrite information in memory portion 708 as needed, whereby the fluttering apparatus may have learning function.

When the information obtained by sensors 701 to 704 is to be simply stored in memory portion 708, sensors 701 to 704 may be directly connected to memory portion 703, not through fluttering control portion 705. Alternatively, fluttering control portion 705 may be connected to communication control portion 709, for data input to/output from communication control portion 709. Communication control portion 709 transmits/receives data to/from an external apparatus (other fluttering apparatus, a base station or the like) through an antenna portion 710.

Such a communication function enables speedy transfer of data obtained by the fluttering apparatus and stored in memory portion 708 to an external apparatus. Further, it is possible to receive from an external apparatus information that cannot be obtained by the fluttering apparatus and to store such information in memory portion 708, so that such information can be used for fluttering control. Without storing a large amount of map information fully in the fluttering apparatus, it is possible to obtain map information of a desired area as needed from a base station.

Though antenna portion 710 is shown as a bar protruding from an end of main body 700 in the example shown in FIG. 14, it may have any shape or arrangement provided that an antenna function is attained. For example, a loop shaped antenna may be formed on the wing, utilizing front wing shaft 712 or rear wing shaft 713. Alternatively, the antenna may be contained in main body 700, or the antenna and communication control portion 709 may be integrated.

Ultrasonic sensor 701, infrared sensor 702, acceleration sensor 703, angular acceleration sensor 704, fluttering control portion 705, left and right actuators 706, center of gravity control portion 707, memory portion 708, communication control portion 709 and antenna portion 710 are driven by a current supplied from a power supply portion 711.

Though electric power is used as driving energy, a internal combustion engine may be used. An actuator utilizing physiological oxidation-reduction reaction as can be seen in the muscle of insects may be used. Further, a method of obtaining energy for driving the actuator from the outside may be possible. For example, a thermister (therminoic element), an electromagnetic wave or the like may be used for the electric power.

(Method of Flight)

For simplicity of description, it is assumed that external force acting on the present fluttering apparatus is only the fluid force received by the wing from the fluid and the gravity acting on the fluttering apparatus (a product of the mass of the fluttering apparatus and gravitational acceleration). For the fluttering apparatus to fly constantly, it is necessary that the following relation is satisfied in time average of one fluttering operation:

(vertically upward fluid force acting on the wing)>(gravity acting on the fluttering apparatus).

One fluttering operation means a down stroke of the wing followed by an up stroke of the wing.

For the apparatus to rise with the vertically upward fluid force being dominant, the following relation must be satisfied:

(vertically upward fluid force acting on the wing in a down stroke)>(vertically downward fluid force acting on the wing in an up stroke).

Here, a method by which the vertically upward fluid force acting on the wing in a down stroke (hereinafter referred to as "fluid force for down stroke") is made larger than the vertically downward fluid force acting on the wing in an up stroke (hereinafter referred to as "fluid force for an up stroke") will be described, which is a method of fluttering corresponding to but simplified from the manner of fluttering of an insect.

For simplicity of description, the behavior of the fluid or the force of the fluid on the wing will be described with reference to main components thereof. The magnitude of the buoyancy force obtained by the fluttering method and the gravity acting on the fluttering apparatus (hereinafter referred to as "weight") will be described later.

In order to make the fluid force for a down stroke larger than the fluid force for an up stroke, the down stroke should be such that the volume of a space in which the wing film 106 moves in the down stroke is maximized. For this purpose, the wing film 106 should be moved downward approximately parallel to the horizontal plane, whereby almost maximum fluid force can be obtained.

By contrast, for the up stroke, the wing should be moved upward such that the volume of the space in which wing film 106 moves is minimized. For this purpose, the wing film 106 should be moved upward approximately at a right angle with respect to the horizontal plane, and the fluid force exerted on the wing is approximately minimized.

Thus, assume that wing shafts 103 and 104 are reciprocated by an angle $\gamma$ upward and downward with the position where the shafts are aligned approximately with the horizontal plane being the center, when the wing shafts 103 and 104 are reciprocated about the rotation axis 800 by rotary actuators 101 and 102. Further, the reciprocating motion of rear wing shaft 104 is adapted to be delayed by an appropriate phase $\phi$ from the reciprocating motion of the front wing shaft 103.

Accordingly, in the series of reciprocating motions of the wing shown in FIGS. 3 to 10 (representing an example where $\theta=20°$), front wing shaft 303 of rotary actuator 301 which is at a higher position is moved downward earlier in the down stroke shown in FIGS. 3 to 7, and therefore tip ends of front and rear wing shafts 303 and 304 and the wing film 306 come closer to 30 horizontal.

In the up stroke shown in FIGS. 7 to 10, difference in height of the tip ends of wing shafts 303 and 304 increases and wing film 306 comes closer to vertical. As a result, the amount of fluid moved downward or upward by the wing film 306 spread across front and rear wing shafts 303 and 304 becomes different. In this fluttering apparatus, the fluid force for the down stroke becomes larger than the fluid force for the up stroke, and hence buoyancy force is generated.

The vector of the buoyancy force inclines forward or backward by changing the phase difference φ. When it is inclined, the apparatus moves forward, when it is inclined backward, the apparatus moves backward and when it is directed directly upward, the apparatus hovers. In the actual flight, it is possible to control fluttering frequency f or fluttering angle γ, in addition to phase difference φ. Though fluttering elevation θ is fixed in the present fluttering apparatus, a function of changing this angle may be added to increase the degree of freedom.

(Fluttering Control)

The actual fluttering control will be described in greater detail. In the above described fluttering apparatus, the torsion angle α provided by the tip end of the wing in the down stroke or up stroke can be approximately represented by the following equation, where l represents wing length (length of the wing film along the front and rear wing shafts), w represents wing width (distance between front and rear wing shafts), γ represents fluttering angle, τ represents phase of the fluttering motion (the instant of highest up stroke being 0° and the lowest down stroke being 180°), and φ represents phase difference between the front and rear wing shafts (see FIGS. 3, 9 and 10):

$$\tan \alpha = (w/l) \cdot [\sin(\gamma \cdot \cos \tau) - \sin\{\gamma \cdot \cos(\tau+\phi)\}]$$

Actually, the front and rear wing shafts are elastic and deformable, and therefore, the torsion angle α may vary to some extent. Further, the angle is smaller closer to the root of the wing shaft. For simplicity of description, the angle a in accordance with the above equation will be used for the following discussion.

Vertical component F of the fluid force acting on the wing free of torsion is approximately given by the following equation, where ρ represents density of the fluid, γ represents fluttering angle and f represents fluttering frequency.

$$F = (4/3) \cdot \pi^2 \rho w \gamma^2 f^2 l^3 \cdot \sin^2 \tau \cdot \cos(\gamma \cdot \cos \tau)$$

Horizontal component of the fluid force acting on the wing is canceled, when motions of the left and right wings are the same.

When the wing has a torsion angle of α, components L and D which are vertical and horizontal to the plane of fluttering motion, respectively, of the component f can be given by:

$$L = F \cdot \cos \alpha \cdot \sin \alpha$$

$$D = F \cdot \cos^2 \alpha$$

Considering elevation θ of fluttering, vertical component A that must be balanced with gravity and horizontal component J that will be the thrust of forward/backward motion are as follows:

For the down stroke $$A\downarrow = -L \cdot \cos \theta + D \cdot \sin \theta$$

$$J\downarrow = -L \cdot \sin \theta - D \cdot \cos \theta$$

For the up stroke $$A\uparrow = L \cdot \cos \theta - D \cdot \sin \theta$$

$$L\uparrow = L \cdot \sin \theta + D \cdot \cos \theta$$

Actual buoyancy or thrust is given as an integration of one period of the fluttering motion.

Figure 15:
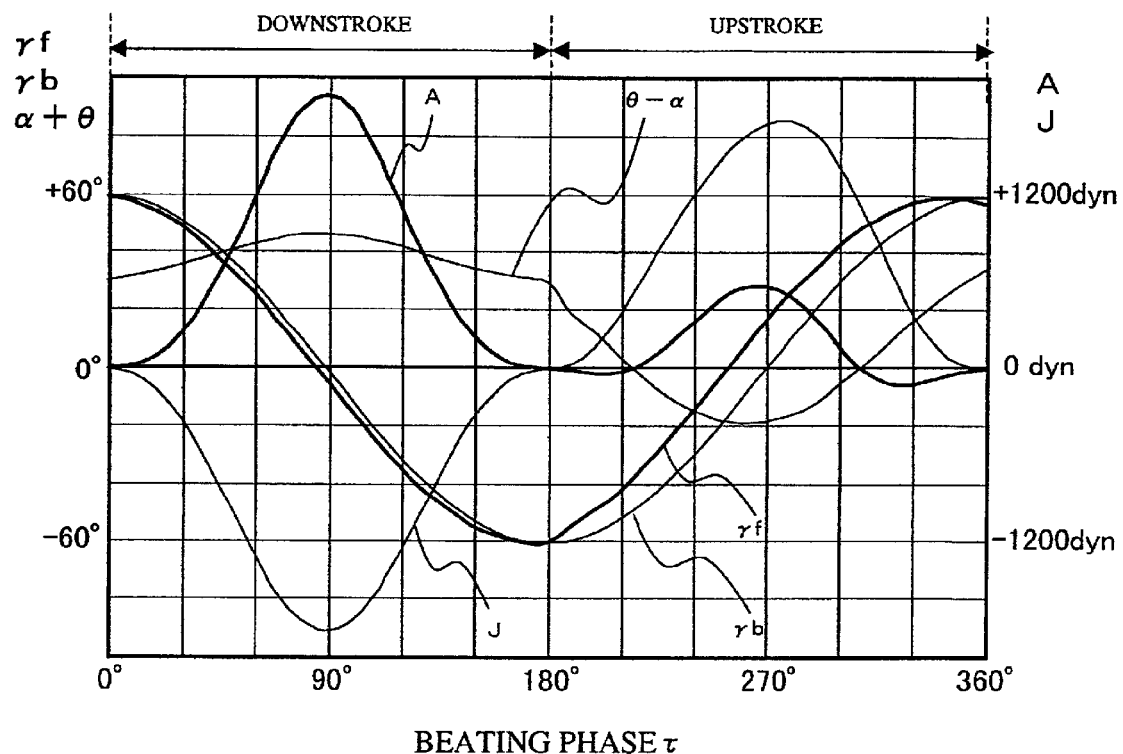
FIG. 15 is a first graph representing changes in force acting on the wing and the angle with respect to the beating phase, respectively.

Based on the foregoing, time change of the vertical component A and the horizontal component J together with the time change of angles are plotted in FIG. 15 as an example of flight control, where the length of the wing of the fluttering apparatus l=4 cm, wing width w=1 cm, fluttering elevation θ=30°, fluttering angle γ=60°, fluttering frequency f=50 Hz, phase difference for the down stroke θ↓=4° and phase difference for the up stroke θ↑=16°.

The abscissa represents the time corresponding to one period, as phase τ. The former half represents a down stroke and the latter half an up stroke. Curves of the graphs represent changes with time of fluttering angle γ f of the front wing shaft, fluttering angle γ b of the rear wing shaft, torsion angle of the wing from a horizontal plane (θ−α), and vertical and horizontal components A and J of the fluid force.

In this example, vertical component A of the fluid force per unit time is larger in the down stroke than in the up stroke, and therefore, one wing provides vertically upward fluid force of about 500 dyn as an average for one period. Namely, if the weight of the fluttering apparatus is about 1 g or smaller, it can be lifted by two wings. The horizontal component J of the fluid force per unit time is almost cancelled in one period, and hence, a fluttering apparatus having the weight of about 1 g can hover.

Here, when the phase difference for the down stroke φ↓ is made larger or when the phase difference for the up stroke φ↑ is made smaller, the apparatus can move forward. At this time, for horizontal forward movement, it is desired that the frequency f be reduced slightly. On the contrary, when the phase difference for the down stroke φ↓ is made smaller or the phase difference for the up stroke φ↑ is made larger, the apparatus can move backward. For horizontal backward movement, it is desired that the frequency f be increased slightly.

When the phase difference for the up stroke φ↑ is kept at 16° while the phase difference for the down stroke φ↓ is enlarged to 7°, or when the phase difference for the down stroke φ↓ is kept at 4° while the phase difference for the up stroke φ↑ is made smaller to 11° with the fluttering frequency f decreased to f=48 Hz, the fluttering apparatus can move horizontally forward at the speed of 1m in the initial 1 second.

When the phase difference for the up stroke φ↑ is kept at 16° and the phase difference for the down stroke φ↓ is made smaller to 1°, or when the phase difference for the down stroke φ↓ is kept at 4° while the phase difference for the up stroke φ↑ is enlarged to 24° with the fluttering frequency f increased to f=54 Hz, the apparatus can move horizontally backward at the speed of about 1 m for the initial 1 second.

In order to raise or lower the fluttering apparatus in the hovering state, the frequency f may be increased or decreased. During horizontal flight, upward movement and downward movement can be controlled mainly by the frequency f. By increasing the frequency f, the fluttering apparatus moves upward, and by lowering frequency f, the fluttering apparatus moves downward.

In the present example, the torsion angle α of the wing is slowly changed during an up stroke or a down stroke, in order to reduce load on the actuator. As the fluttering motion to obtain buoyancy, the torsion angle α may be set at a predetermined value during an up stroke or down stroke and the torsion angle α may be abruptly changed at the transition point from a down stroke to an up stroke or from an up stroke to the down stroke.

Figure 16:
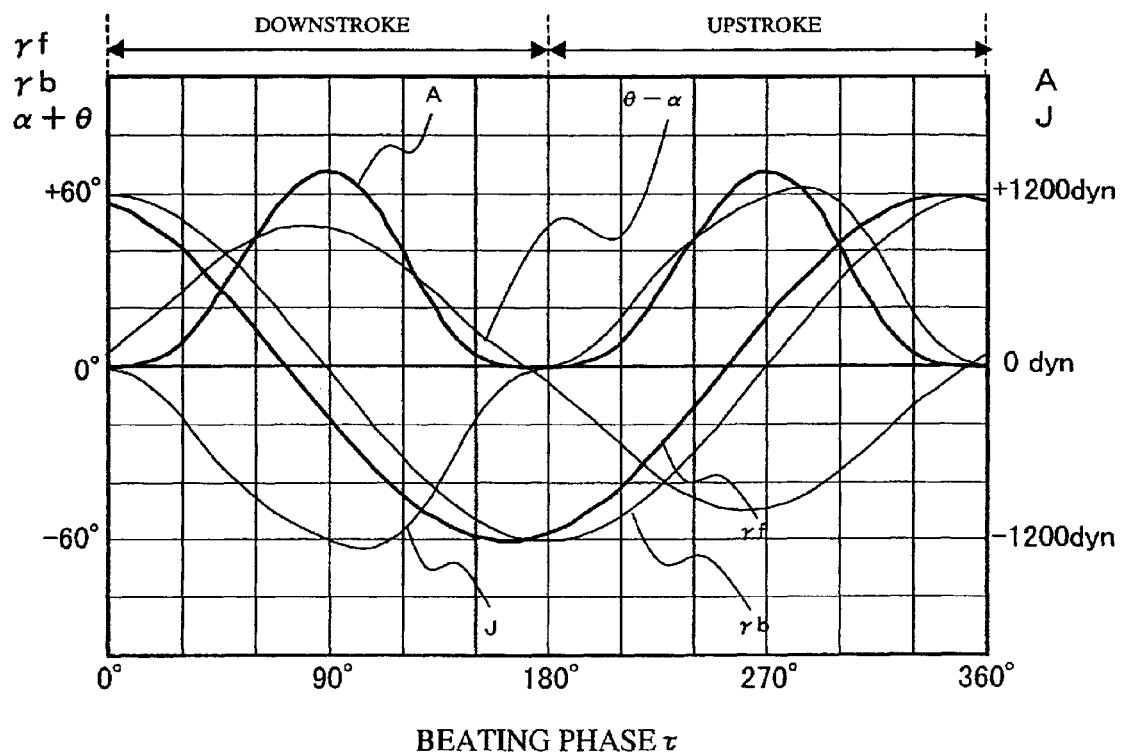
FIG. 16 is a second graph representing changes in the force acting on the wing and the angle with respect to the beating phase.

FIG. 16 shows change with time of the vertical component A and horizontal component J together with the change with time of the angles, where fluttering elevation θ=0°. This example shows a fluttering motion conceived from the hovering of a humming bird. Steering to the left or to the right may be realized by generating a difference in thrust of left and right wings, if it is possible to separately control fluttering motions of the left and right wings. For example, when the apparatus is flying forward and is to be turned to the right, the fluttering angle γ of the right wing should be made smaller than that of the left wing, or phase difference between the front wing shaft and the rear wing shaft of the right wing is made larger than that of the left wing, or alternatively, the fluttering elevation θ of the right wing should be made smaller than the left wing, if the fluttering elevation θ is controllable. Thus, the thrust of the right wing becomes lower relative to the thrust of the left wing, and hence the apparatus can turn to the right. When the fluttering apparatus is to be turned to the left, the control is opposite.

When separate control of the left and right wings is not possible as in the fluttering apparatus shown in FIG. 13, a center of gravity control portion 707 that is mounted in the fluttering apparatus shown in FIG. 14 may be mounted in the present fluttering apparatus so as to shift the center of gravity of the fluttering apparatus to the left or to the right, to enable turning to the left or to the right.

For example, by shifting the center of gravity to the right, inclining the right wing downward and the left wing upward, and by increasing the frequency f, the fluttering apparatus can turn to the right. By shifting the center of gravity to the left and by increasing the frequency f in the similar manner, the fluttering apparatus can turn to the left. This method is also applicable when separate control of the two wings is possible. In any type of the fluttering apparatuses, it is desired that fluttering frequency f for the left be set to the same value as the fluttering frequency f for the right, so as to keep stable the attitude of the apparatus.

In the foregoing, an example has been described in which the plane in which the front (rear) wing shafts 103, 104 reciprocates orthogonally crosses the rotation axis 800. In this example, these two planes are parallel to each other. As shown in FIG. 14, however, the plane in which the front (rear) wing shaft 712 or 713 reciprocates may have an angle. In that case, because of the elasticity of the front (rear) wing shaft 712, 713 or the tension of wing film 714, the transition from a positive value to a negative value or from a negative value to the positive value of the torsion angle α of the wing, at a transition from an up stroke to the down stroke or from a down stroke to an up stroke can be attained more quickly.

Figure 40:
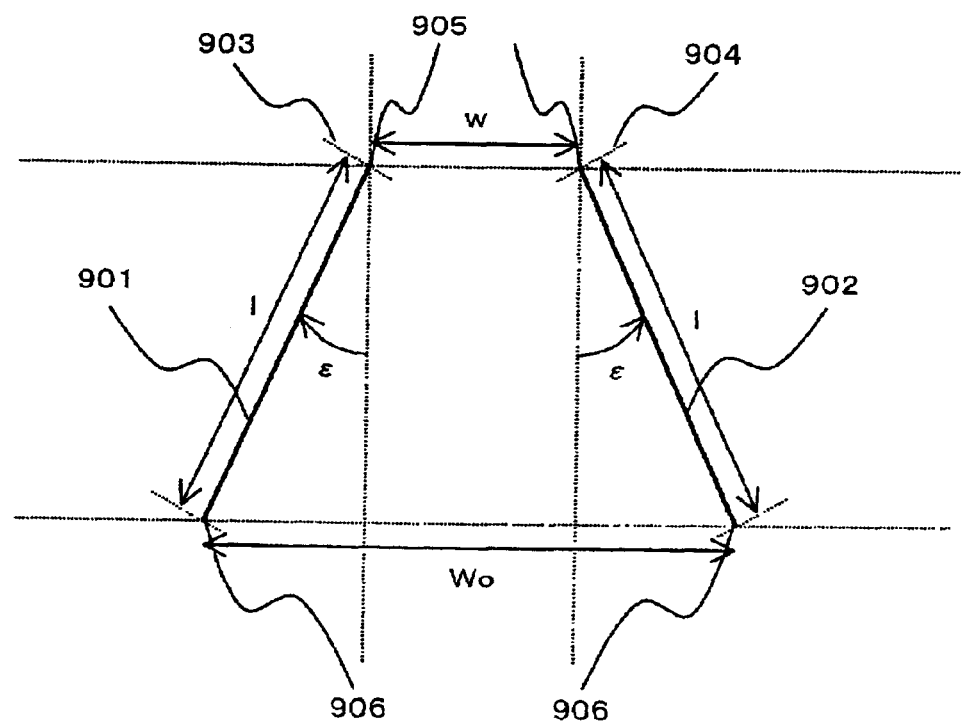
FIG. 40 is an illustration showing a relation between two wing shafts, when tip ends of front and rear wing shafts are facing outward by an angle ε from mutually parallel positions.

Referring to FIG. 40, when tip end directions of front (rear) wing shafts 901 and 902 are outward by an angle s from mutually parallel positions, the distance Wo between the tip ends 906 of the wing shafts becomes the maximum with the wing torsion angle α=0° (γ f=γ b), when the value ε satisfies the following relation, where w represents the width between the roots 905 of the wing shafts and 1 represents the length of the wing shaft. Therefore, the elasticity of the wing shaft and the tension of the wing film also become the maximum, and the state where the absolute value |α|>0 becomes stabler. Thus, the change in the torsion angle α can be attained more quickly.

$$\sin \epsilon > \{(w^2 + 8 \cdot 1^2)^{1/2} - w\}/4 \cdot 1$$

The value ε satisfying the above relation is, when the aspect ratio of the wing Ap (l/w)=1, ε>30°, when Ap=4, ε>17.2°, and when Ap=10, ε>11.5°.

When degree of freedom for the front (rear) wing shafts 712 and 713 to pivot about their axes is added, it becomes possible to rotate the portions of the wing film 714 which are fixed to the front (rear) wing shafts 712 and 713 to be substantially opposite to each other, regardless of the change in positional relation between the front (rear) wing shafts 712 and 713. Therefore, the load on actuator 706 can be reduced and highly efficient control becomes possible.

Second Embodiment

The fluttering apparatus as a moving apparatus in accordance with the second embodiment of the present invention will be described in the following. Here, as in the first embodiment, the force exerted by the fluid on the wing will be referred to as fluid force. For simplicity of description, it is assumed that the airflow occurs only by the fluttering, that is, there is no wind.

(Main Configuration)

Figure 17:
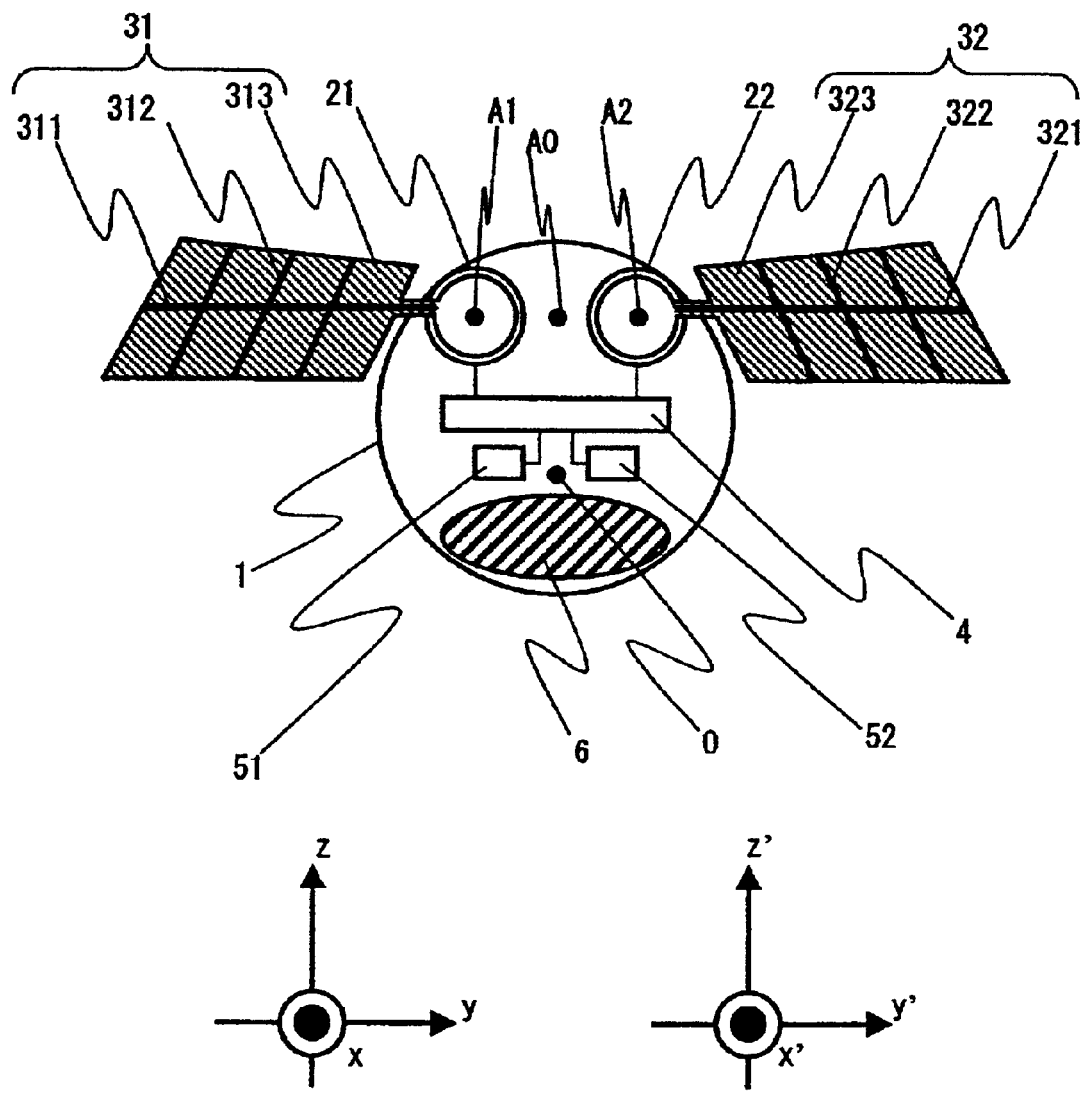
FIG. 17 is a front view showing a structure of the fluttering apparatus in accordance with a second embodiment of the present invention.

First, main configuration of the fluttering apparatus will be described. Referring to FIG. 17, a right actuator 21 and a left actuator 22 are fixed on an upper portion of a supporting structure 1. A right wing 31 is attached to right actuator 21, and a left wing 32 is attached to left actuator 22.

Actuators 21 and 22 allow wings 31 and 32 attached thereto rotate with three degrees of freedom, approximately about the fulcrums of the actuators. Rotation of each of the actuators 21 and 22 is controlled by a control circuit 4 mounted on support structure 1.

Desirably, the support structure 1 is sufficiently lightweight, while assuring mechanical strength. For the support structure 1 of the fluttering apparatus, polyethylene terephthalate (PET) mold to an approximately spherical shell is used.

An acceleration sensor 51 and an angular acceleration sensor 52 are mounted on support structure 1. Results of detection by sensors 51 and 52 are transmitted to control apparatus 4. Control apparatus 4 detects the state of flight of the fluttering apparatus, based on the information transmitted from acceleration sensor 51 and angular acceleration sensor 52. Then, control apparatus 4 determines driving of left and right actuators 21 and 22, in accordance with the target position and attitude at that time.

The left and right actuators 21, 22, control apparatus 4, acceleration sensor 51 and angular acceleration sensor 52 are driven by a current supplied by a power source 6. The center of gravity of the fluttering apparatus is positioned lower than the point of application of the force exerted by the fluid on the wing, to the actuator.

(Actuator)

As the actuators 21 and 22, one using a piezo-electric element is desired, as it has large activation torque, ensures reciprocating operation and has a simple structure. Such an actuator is referred to as an ultrasonic motor, and is driven by a progressive wave generated by the piezo-electric element.

Figure 18:
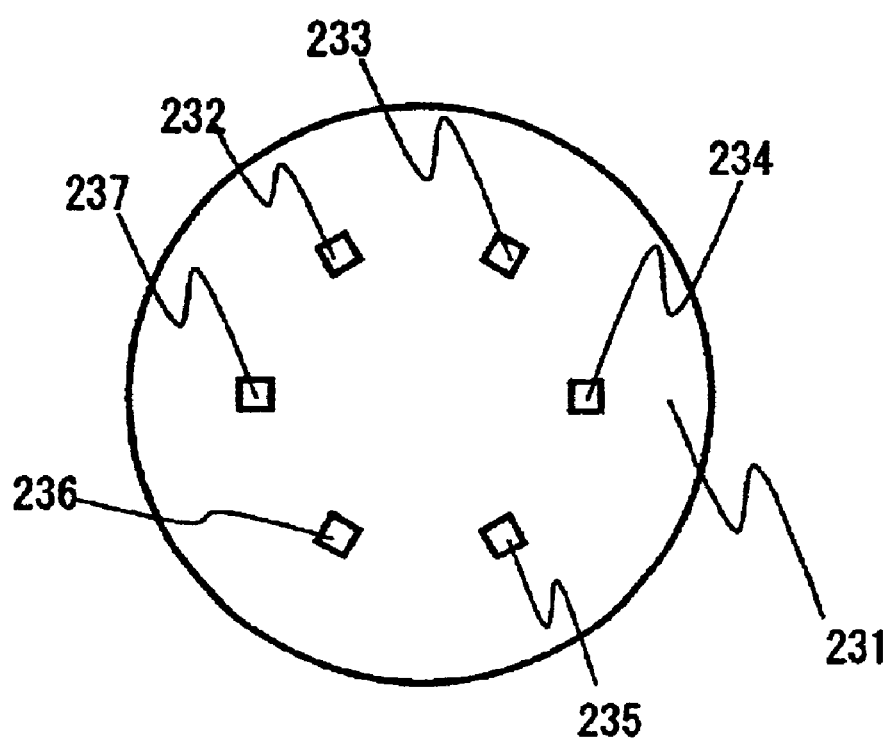
FIG. 18 is a plan view showing an ultrasonic motor representing an actuator used for the fluttering apparatus in accordance with the second embodiment.
Figure 19:
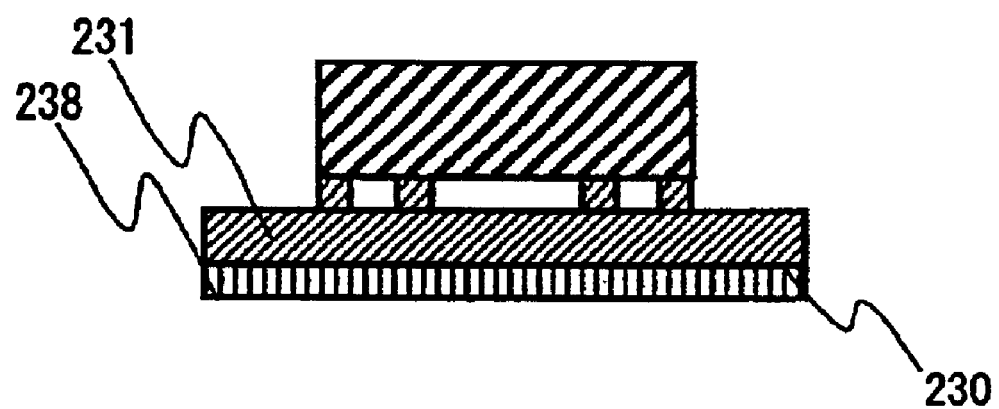
FIG. 19 is a side view showing the ultrasonic motor representing the actuator used for the fluttering apparatus of the second embodiment.
Figure 20:
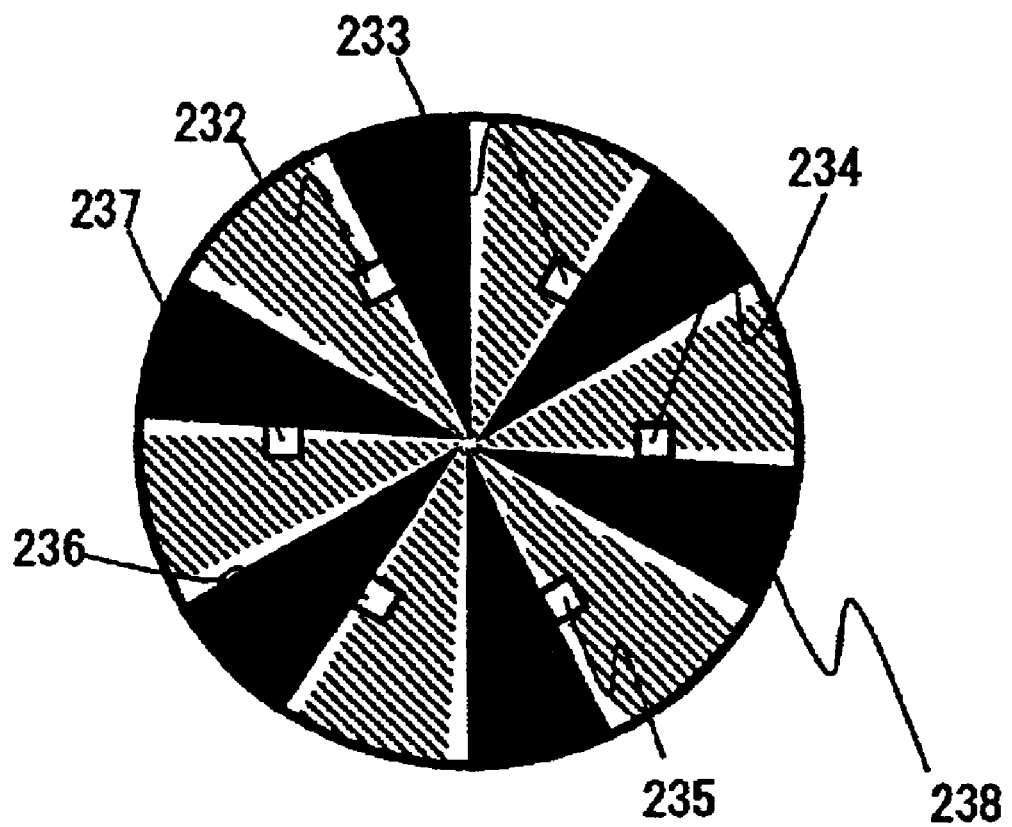
FIG. 20 is an illustration representing an operation of the ultrasonic motor shown in FIGS. 18 and 19.

FIGS. 18 and 19 represent a commercially available ultrasonic motor 23. Referring to FIGS. 18 and 19, a piezo-electric element 230 is adhered on a lower surface of an aluminum disc 231. Further, a plurality of projections 232 to 237 are provided on an upper surface of disc 231. Projections 232 to 237 are arranged at positions of vertexes of a regular hexagon, of which center of gravity is the center of disc 231.

On the lower surface of piezo-electric element 230, electrodes 238 divided into 12 along the circumferential direction are arranged. Every other electrode is electrically short-circuited. A voltage is applied, with the disc 231 being the reference, to each electrode. Therefore, voltages of two different phases are applied to the piezo-electric element 230, as represented by the hatched and non-hatched portions.

By changing with time the voltage to be applied to each electrode, a progressive wave is generated on disc 231, so that tip end portions of projections 232 to 237 perform elliptic motion, which enables operation of rotor 239. The stator of the ultrasonic motor is structured as described above.

The ultrasonic motor 23 has the torque of 1.0 gf·cm, rotation speed with no-load of 800 rpm and maximum current consumption of 20 mA. The diameter of disc 231 is 8 mm. Projections 232 to 237 are arranged at an interval of 2 mm. The thickness of the disc 232 is 0.4 mm. The height of projections 232 to 237 is about 0.4 mm. Driving frequency of piezo-electric element 230 is 341 kHz.

Figure 21:
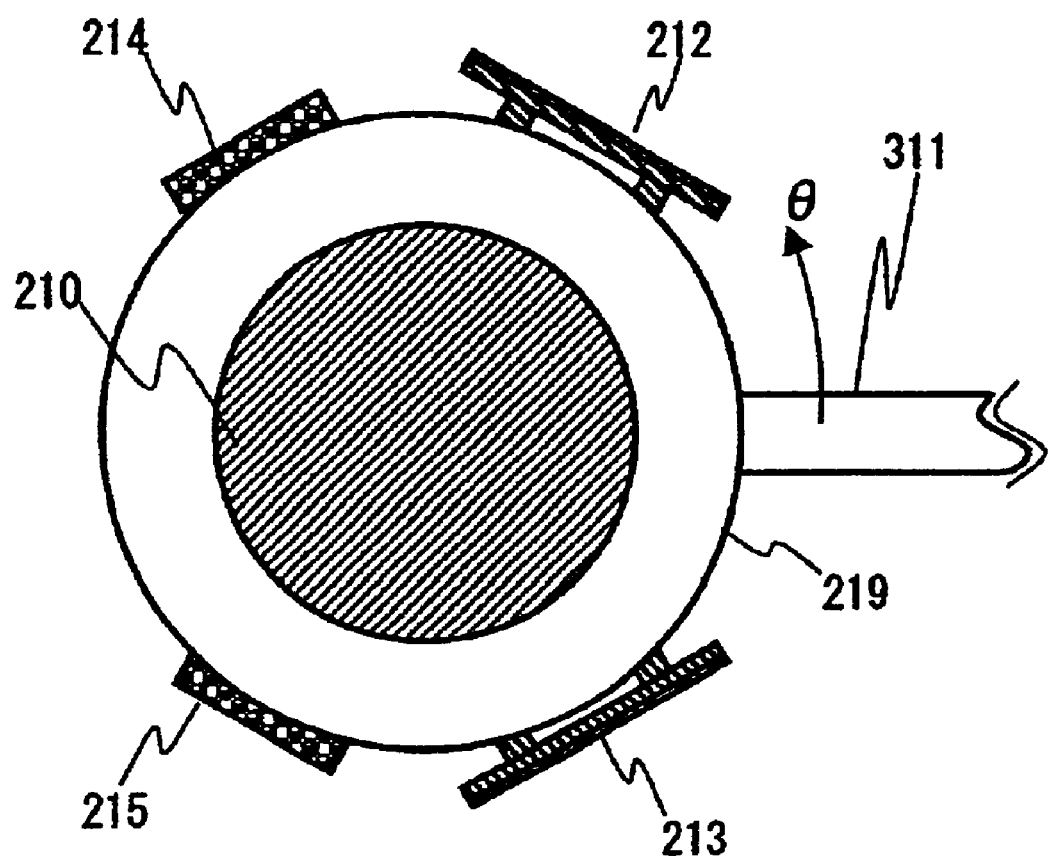
FIG. 21 is an illustration representing a configuration of the actuator used in the fluttering apparatus of the second embodiment.
Figure 22:
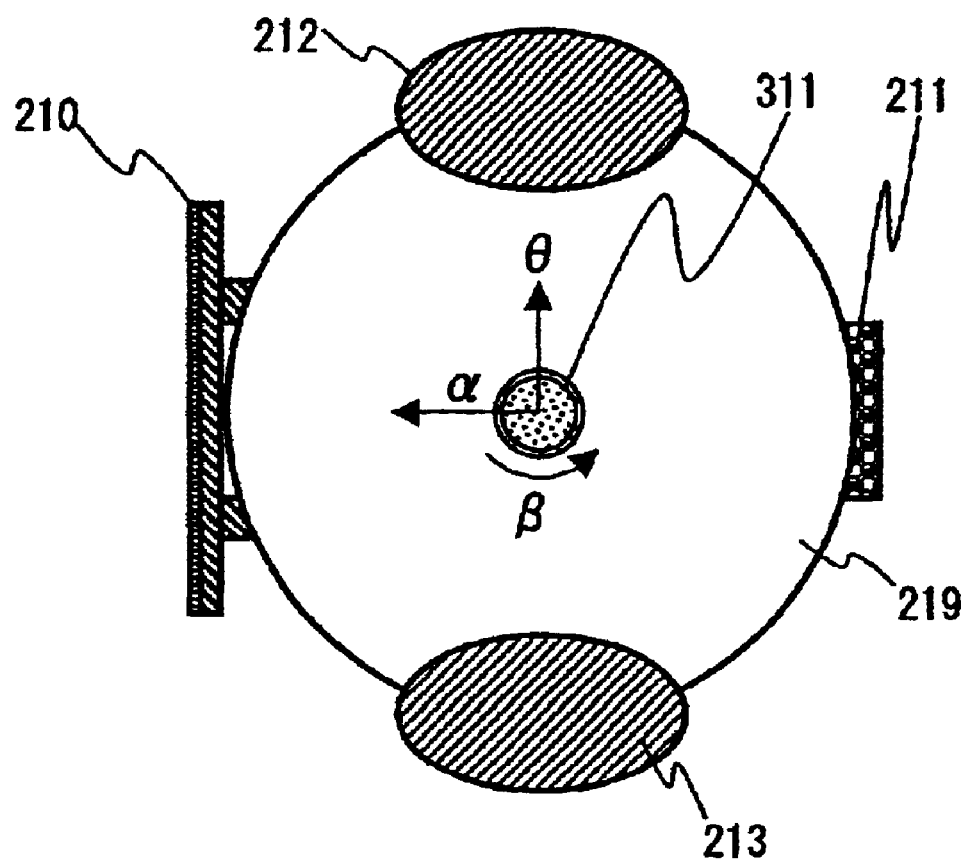
FIG. 22 is a second illustration representing the configuration of the actuator used for the fluttering apparatus in accordance with the second embodiment.

In the present fluttering apparatus, an actuator utilizing the stator portion of the ultrasonic motor is used. As shown in FIGS. 21 and 22, in the right actuator 21, for example, a spherical shell shaped rotor 219 is pinched and held by such a stator 210 and a bearing 211. That portion of stator 210 which is in contact with rotor 219 is processed to conform to the surface of rotor 219.

Rotor 219 is of a spherical shape having an outer diameter of 3.1 mm and an inner diameter of 2.9 mm. A right wing main shaft 311 is attached to a surface portion of rotor 219. When an operation is performed to convey rotor 219 clockwise to that surface of stator 210 which has the projections thereof, the right wing main shaft 311 moves in the direction of θ shown in FIG. 22. Here, the rotation clockwise to the surface of stator 210 having projections is referred to as forward rotation, and counterclockwise rotation will be referred to as backward rotation.

As shown in FIGS. 21 and 22, in order to drive rotor 219 with three degrees of freedom, an upper auxiliary stator 212, a lower auxiliary stator 213 and bearings 214 and 215 are further provided. The size of upper auxiliary stator 212 and lower auxiliary stator 213 is about 0.7 times that of stator 210.

Though stators 210, 212 and 213 are not arranged to be orthogonally crossing with each other with the rotor 219 therebetween, the stators 210, 212 and 213 can cause mutually independent rotation of rotor 219. By combining respective rotation motions, it is possible to drive rotor 219 with three degrees of freedom.

For example, by causing forward rotation of rotor 219 by upper auxiliary stator 212 and generating forward rotation by lower auxiliary stator 212, it is possible to rotate rotor 219 in the direction β. By causing backward rotation of rotor 219 by upper auxiliary stator 212 and forward rotation by lower auxiliary stator 212, it is possible to rotate rotor 219 in the direction α.

In actual driving, combining two rotations of different centers of rotation will lower efficiency of the ultrasonic motor, because of friction. Therefore, it is desirable to adopt such a method of driving that the upper auxiliary stator 212 and the lower auxiliary stator 213 are operated alternately in a very short period, while the projection of the stator which is not in operation is prevented from contacting rotor 219.

This can be readily attained without the necessity of adding any element, by applying a voltage to every electrode of the stator, in the direction of contraction of the piezoelectric element.

The driving frequency of the piezo-electric element is at least 300 kHz. By contrast, the fluttering frequency of the fluttering apparatus is 100 kHz, at the highest. Therefore, the driving frequency of the piezo-electric element is sufficiently higher than the fluttering frequency of the fluttering apparatus. Therefore, even when the actuators are operated alternately, the right wing main shaft 311 can move substantially smooth.

The stator of the actuator described above has been implemented and available. Further, bearings and the like used for the actuator that are applicable to the fluttering apparatus of the present invention considering the weight have already been practically implemented in the field of compact information equipments such as disc drives or in the field of space components.

As the amplitude of the progressive wave generated by the stator is in the order of submicrons, it is necessary that the rotor has the sphericity of this order. Processing accuracy of a paraboloidal mirror used in civil optical products is about one eighth of the optical wavelengths, that is, at most 70 nm in optical products used for visual range, and processing accuracy of optical components used for optical interferometer is about one hundredth of the optical wavelengths, that is, in the order of several nm. Therefore, it is possible to form a rotor having the sphericity of submicron order by existing processing method.

In this manner, an actuator is formed that has characteristics comparable to that of a commercially available ultrasonic motor and can realize motion of three degrees of freedom. It should be understood, however, that it is only an example of an actuator realizing motion with three degrees of freedom of the wing implemented by an ultrasonic motor. Arrangement, size, material and the method of driving various components of the fluttering apparatus are not limited to those described above, provided that physical function such as torque required of the fluttering flight can be realized.

(Wing and Its Operation)

Next, the wing and its operation will be described. For simplicity of description, a fixed coordinate system (x, y, z) is defined for the fluttering apparatus as shown in FIG. 17. More specifically, approximately the center (spherical center) of the substantially spherical support structure 1 is regarded as the origin. Further, the direction of gravitational acceleration is regarded as the downward direction, and the opposite is regarded as the upward direction. The z axis is defined as extending from the origin to the upward direction. Next, the direction coupling the center of the shape of right actuator 21 and the center of the shape of left actuator 22 is regarded as the left/right direction, and y axis is defined as extending from the origin to the left wing. Further, the x axis is defined as extending in the direction of vector product, in the right hand system of the y and z axes, from the origin. The positive direction along the x axis is referred to as forward, and the negative direction along the x axis is referred to as backward.

In the fluttering apparatus shown in FIG. 17, the center of gravity O of the apparatus is positioned on a line extended downward in the direction of gravitational acceleration from a midpoint A0 between the point of application A1 of right actuator 21 of right wing 31 and the point of application A2 of left actuator 22 of left wing 32.

In the fluttering apparatus, the rotor 229 of left actuator 22 is substantially spherical, and the left wing 32 is arranged such that the spherical center of rotor 220 is positioned on a line extended from the main shaft 321. The point of application A2 of left actuator 22 and the fulcrum of rotating motion of main shaft 321 correspond to the spherical center. The same applies to right actuator 21.

In the following, it is assumed that the x, y and z axes described above constitute a unique coordinate system for the fluttering apparatus fixed on the support structure 1.

Relative to the coordinate system fixed for the fluttering apparatus, x', y' and z' axes are defined as space coordinates fixed in the space and having an arbitrary point as the origin. Thus, the coordinates of the space in which the fluttering apparatus moves can be represented by the coordinates of x', y' and z' axes, respectively, while the coordinates unique to the fluttering apparatus can be represented by the coordinates of x, y and z axes, respectively.

Figure 23:
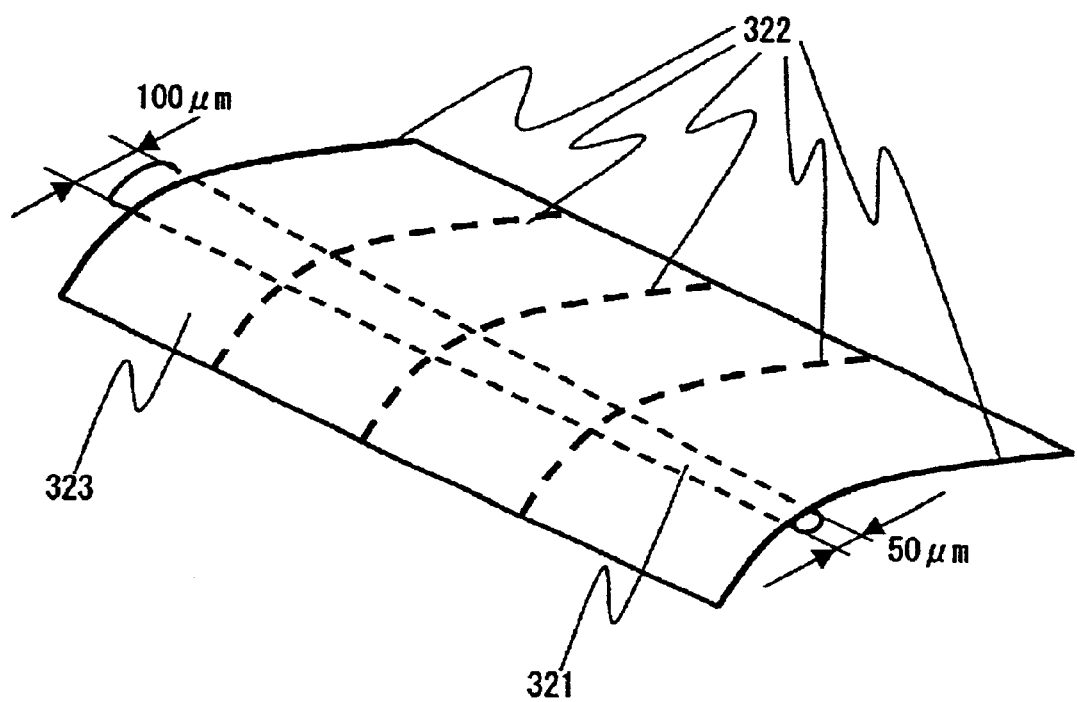
FIG. 23 is an enlarged perspective view showing the wing in accordance with the second embodiment.

The wing structure will be described in the following. Referring to FIG. 23, left wing 32, for example, is formed by spreading a film 323 over a support member having a main shaft 321 and branches 322. Main shaft 321 is arranged at a position closer to the front of left wing 32. Branches 322 are bent downward near the tip end portions.

Left wing 32 has a convex cross sectional shape. Thus, high stiffness is obtained against the force exerted by the fluid especially in a down stroke. In order to reduce weight, main shaft 321 and branches 322 have hollow structure, and are formed of carbon graphite. Film 323 has initial stress in a direction of contraction in its plane, so as to enhance stiffness of the entire wing.

The diameter of main shaft 321 of the wing used for the experiment by the inventors was 100 $\mu$m at the root supported by support structure 1 and 50 $\mu$m at the tip end, and the main shaft 321 is tapered, made thinner from the root to the tip end portion. Film 323 is of polyimide, of which size is about 1 cm in the forward/backward direction, about 4 cm in the left/right direction, and the thickness was about 2 $\mu$m.

In left wing 32 shown in FIG. 23, main shaft 321 is enlarged in its thickness, for easier description. The right wing 31, not shown, is attached to the support structure to be mirror-symmetry with the left wing 32, with the xz plane at the center.

The operation of the wing will be described with reference to the left wing 32 as an example. Left actuator 22 is capable of rotating left wing 32 with three degrees of freedom. Namely, the state of driving (fluttering state) of left wing 32 can be represented as the attitude of left wing 32. For the simplicity of description, in the following, the attitude of left wing 32 will be defined as follows, based on the state shown in FIG. 17.

Figure 24:
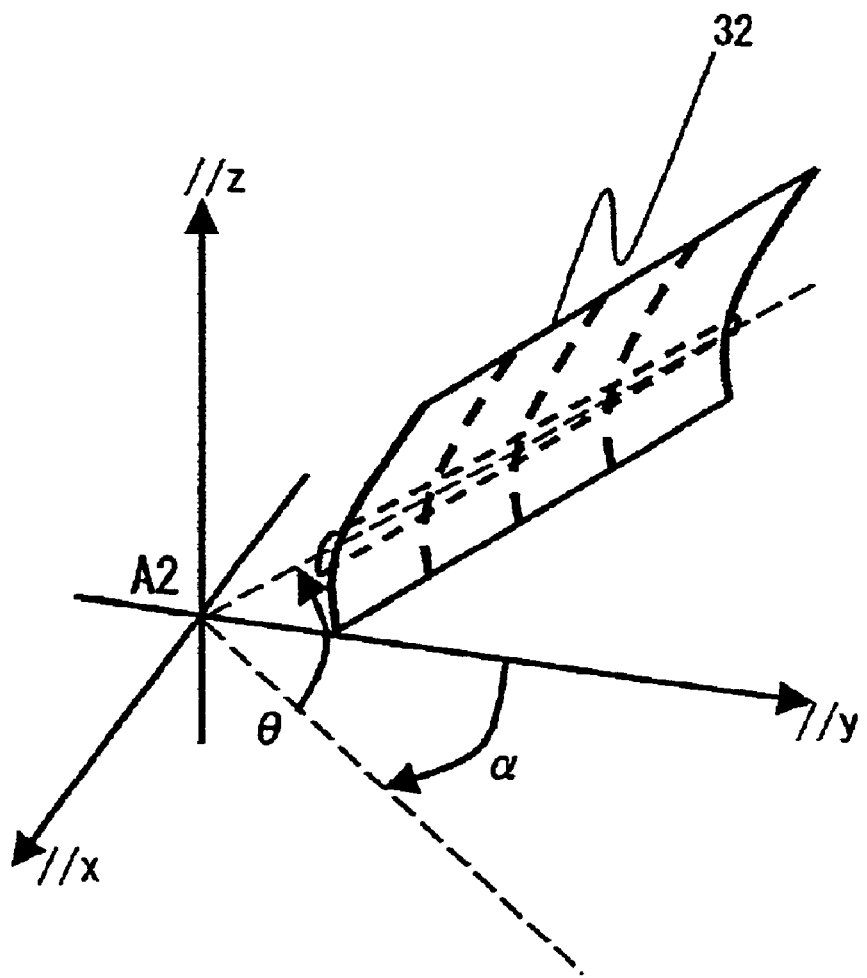
FIG. 24 represents a stroke angle θ and a declination α in the second embodiment.

First, referring to FIG. 24, using a plane parallel to the xy plane and including a fulcrum of rotation motion of the main shaft (mechanical point of application A2) and axes (//x, //y) parallel to the x and y axes, respectively, as a reference, an angle formed by a line connecting the point A2 and the root of main shaft 321 of left wing 32 with that plane is referred to as a stroke angle θ of fluttering. Further, using a plane parallel to the yz plane and including a fulcrum of the rotation motion of the main shaft (mechanical point of application A2) and axes (//y, //z) parallel to the y and z axes, respectively, as a reference, an angle formed by a line connecting the point A2 and the root of main shaft 321 of the left wing 32 and that plane is referred to as declination α.

At this time, the stroke angle θ is considered positive when it is above the plane parallel to the xy plane, and negative when it is below that plane. The declination α is considered positive when it is in front of the plane parallel to the yz plane and negative when it is behind.

Figure 25:
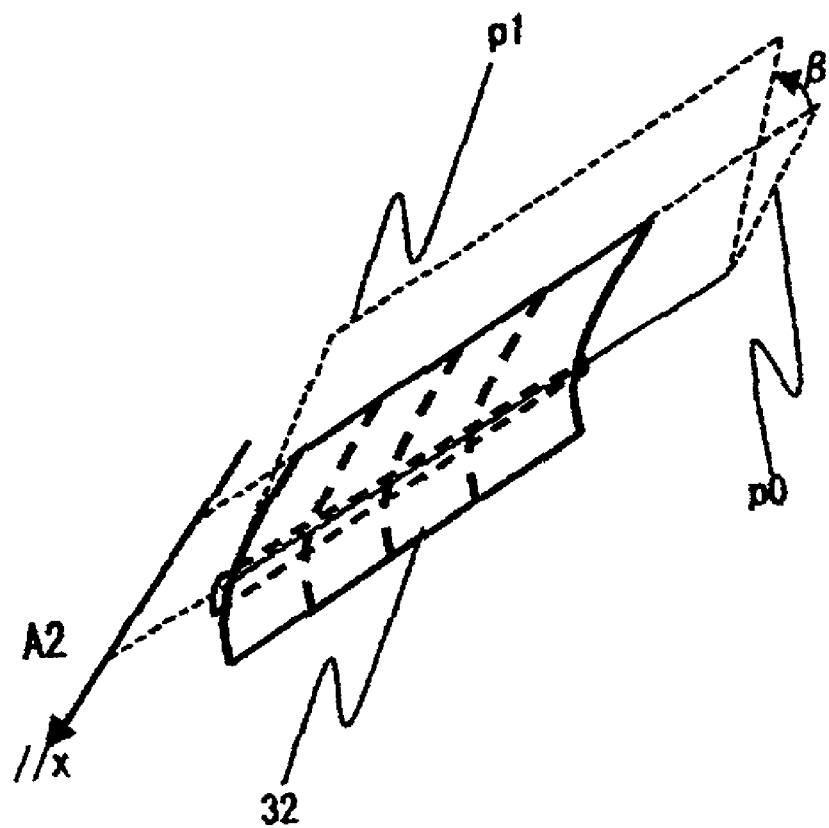
FIG. 25 represents a torsion angle β of the second embodiment.

Referring to FIG. 25, an angle formed by a tangential plane p1 of film 323 at the root of main shaft 321 of left wing 32 forms with a plane p0 passing through the point A2 and including the axis (//x) parallel to the x axis and the main shaft 321 is referred to as torsion angle β. Here, the torsion angle β in the clockwise direction when viewed from the root to the tip end of main shaft 321 is considered positive.

(Method of Flight)

The method of rising will be described in the following. For the simplicity of description, it is assumed that the external force acting on the fluttering apparatus is only the force exerted by the fluid on the wing, that is, the fluid force, and the gravity (the product of mass of the fluttering apparatus and gravitational acceleration) acting on the fluttering apparatus. In this fluttering apparatus also, for constant flight, the following relation must be satisfied in time average for one fluttering operation:

(vertically upward fluid force acting on the wing)>(gravity acting on the fluttering apparatus)

Here, a method of increasing the fluid force for a down stroke to be larger than the fluid force for the up stroke, using the fluttering method that is a simplification of fluttering of an insect will be described. For simplicity of description, the behavior of the fluid and the force exerted thereby on the wing will be described, referring to the main components thereof. The magnitude of the buoyancy force obtained by the fluttering method and the gravity acting on the fluttering apparatus will be described later.

As the fluid force in the direction opposite to the direction of movement of the wing acts on the wing, an upward fluid force acts on the wing in a down stroke, and a downward fluid force acts on the wing in an upstroke. Therefore, by increasing the fluid force for the down stroke and decreasing the fluid force in an upstroke, an upward fluid force is obtained by time average, in one fluttering operation (a down stroke and an up stroke).

For this purpose, first, the wing should be moved downward such that the space in which the wing moves is maximized, in the down stroke, so that almost maximum fluid force acts on the wing. This corresponds to the movement of the wing moved downward approximately vertical to the tangential plane of the wing. For the upstroke, the wing should be moved upward such that the volume of the space in which the wing moves is minimized, so that the fluid force acting on the wing is almost minimized. This corresponds to the movement of the wing moved upward approximately along the curve of the wing cross section.

Figure 26:
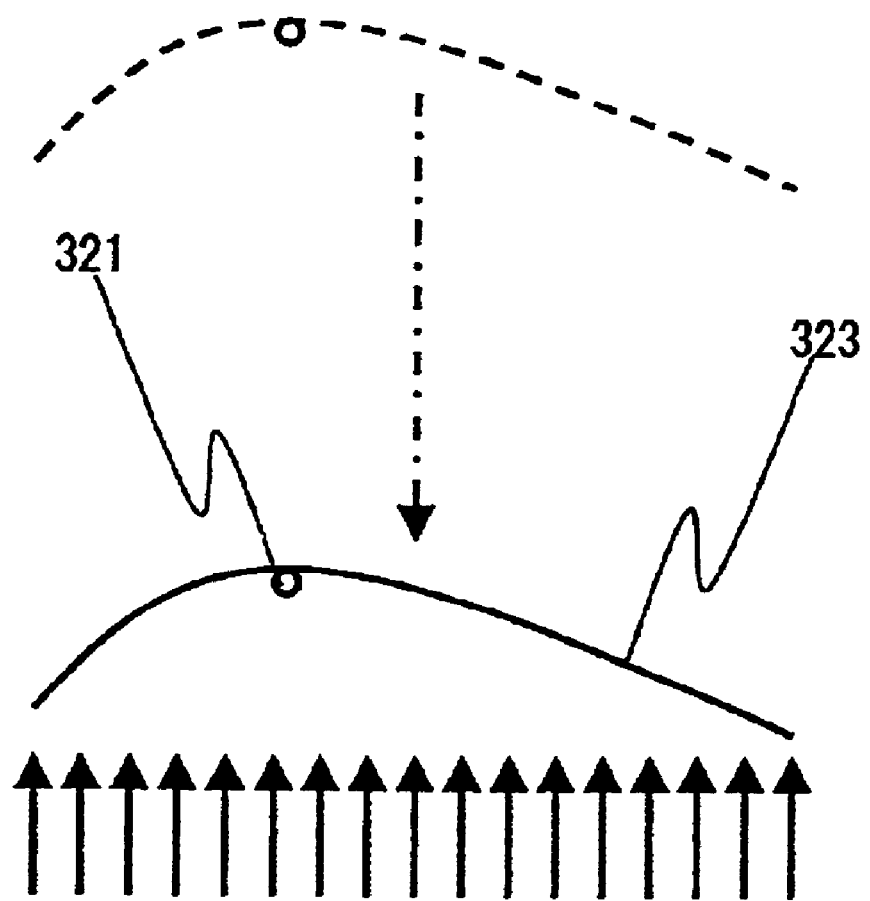
FIG. 26 represents a down stroke of the fluttering apparatus in accordance with the second embodiment.

Such operation of the wing will be described with reference to a cross section vertical to the main shaft 321 of the wing. FIG. 26 shows a down stroke made to maximize the volume of the space in which the wing moves and FIG. 27 shows an up stroke made to minimize the volume of the space in which the wing moves.

Figure 27:
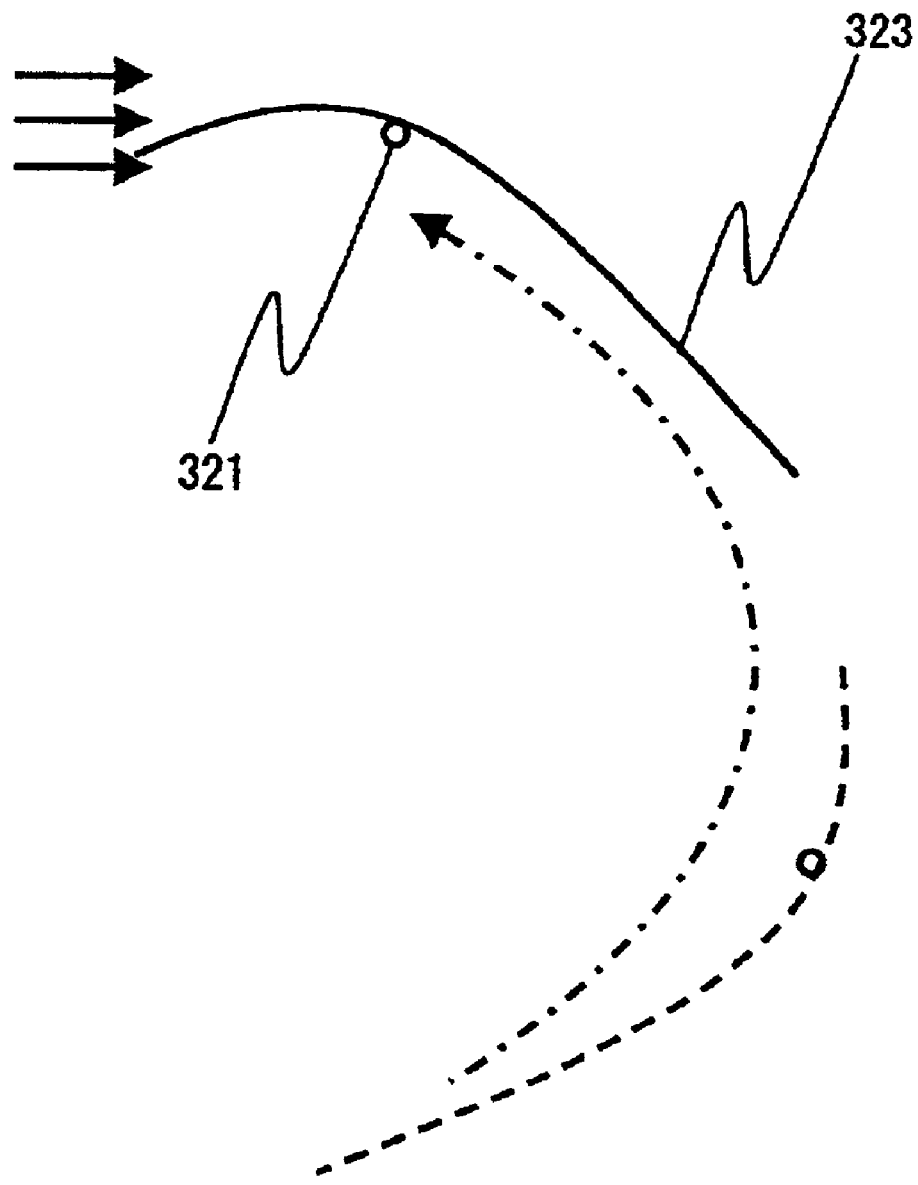
FIG. 27 represents an up stroke of the fluttering apparatus of the second embodiment.

In FIGS. 26 and 27, the position of the wing before movement is represented by a dotted line, and the position of the wing after movement is represented by the solid line. Further, the direction of movement of the wing is represented by a chain dotted arrow. Further, the direction of the fluid force acting on the wing is represented by solid arrows. As can be seen in the figures, the fluid force acts on the wing in the direction opposite to the direction of movement of the wing.

In this manner, the attitude of the wing is changed relative to the direction of movement of the wing such that the volume of the space in which the wing moves in the up stroke is made larger than the volume of the space in which in the wing moves in the down stroke, whereby the upward fluid force acting on the wing can be made larger than the gravity acting on the fluttering apparatus, in time average of one fluttering operation.

In the present fluttering apparatus, the above described wing motion is realized by changing with time the torsion angle β of the wing.

Figure 28:
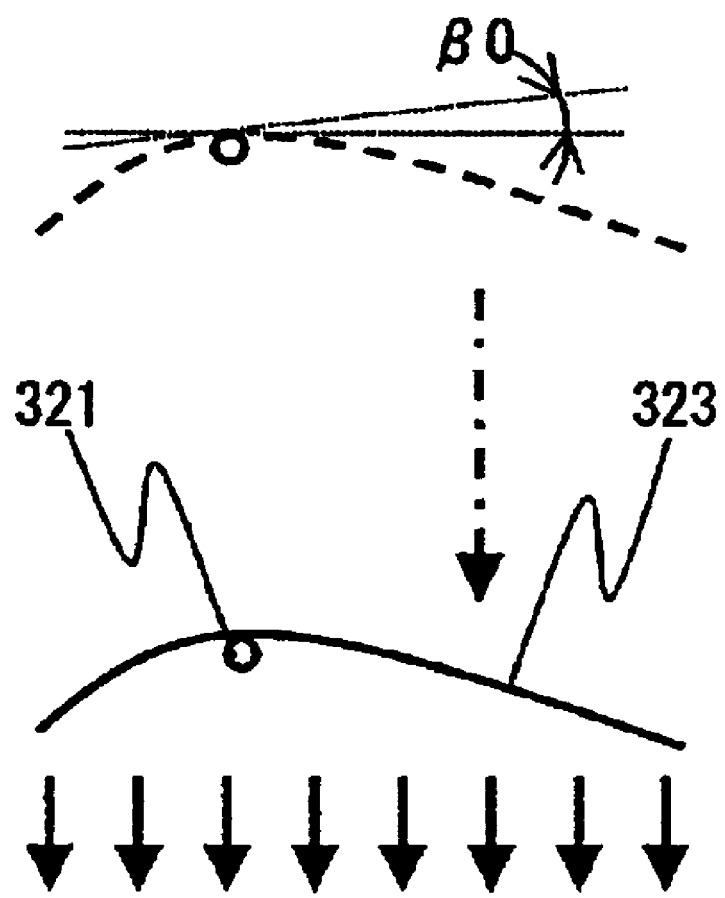
FIGS. 28 to 31 show the first to fourth states of the fluttering operation of the fluttering apparatus in accordance with the second embodiment.
Figure 29:
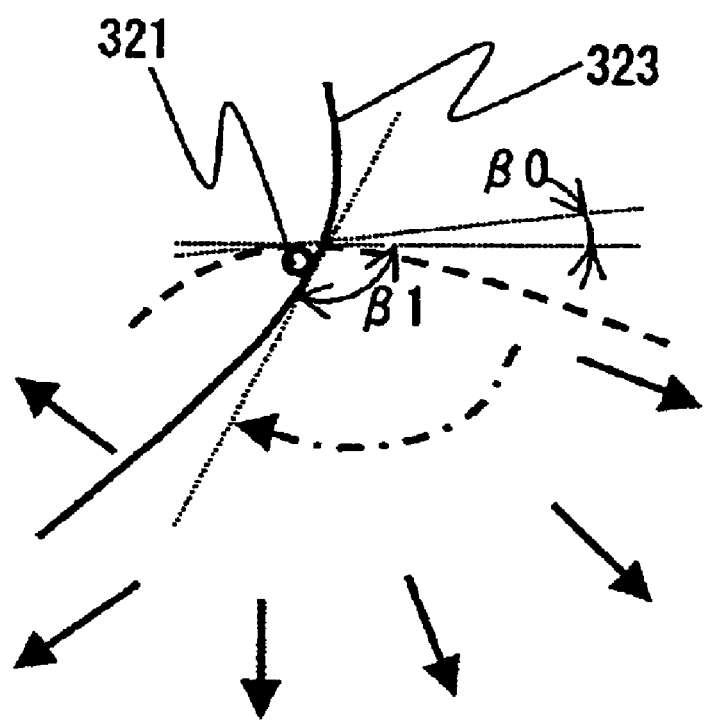
Figure 30:
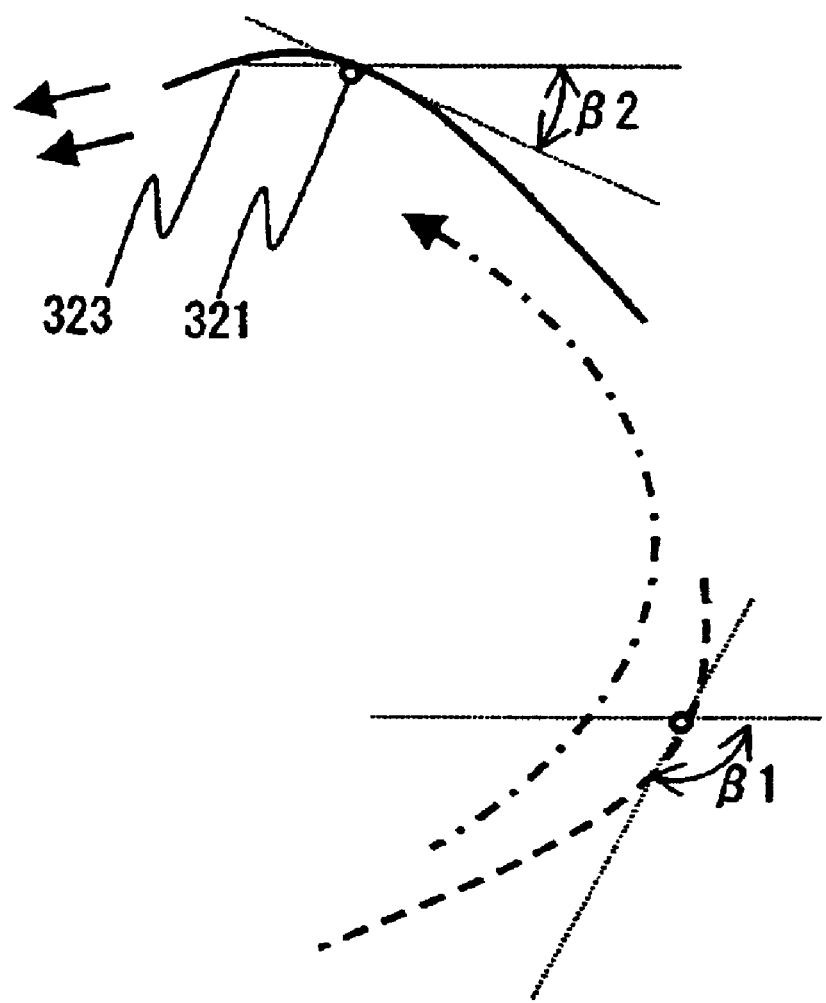

More specifically, the following steps S1 to S4 are repeated. First, in step S1, the wing is moved downward as shown in FIG. 28 (stroke angle θ=+θ$_0$→−θ$_0$). In step S2, the wing rotation 1 operation (torsion angle β of the wing= β$_0$→β$_1$) is performed as shown in FIG. 29. In step S3, the wing is moved upward as shown in FIG. 30 (stroke angle $\theta = -\theta_0 \rightarrow +\theta_0$, torsion angle $\beta = \beta_1 \rightarrow \beta_2$ (a motion along the curve of the wing cross section so as to maintain the fluid force minimum)). In step S4, wing rotation 2 operation (torsion angle $\beta$ of the wing=$\beta_2 \rightarrow \beta_0$) is performed as shown in FIG. 31.

When the fluid forces acting on the wing in steps S1 and S3 are time-averaged, upward fluid force is larger than the gravity acting on the fluttering apparatus. It is desired that time average of the fluid forces acting on the wing in steps S2 and S4 is upward fluid force.

In the fluttering apparatus, the center of rotation of the wing (the portion of main shaft 321) is positioned near a front edge of the wing, as shown in FIGS. 28 to 31. More specifically, the length from main shaft 321 to the rear edge of the wing is longer than the length from main shaft 321 to the front edge of the wing. Therefore, in the rotating operation of the wing, in addition to the flow of the fluid generated along the direction of rotation of the wing, a flow of the fluid is generated along the direction from the main shaft 321 to the rear edge of the wing.

Figure 31:
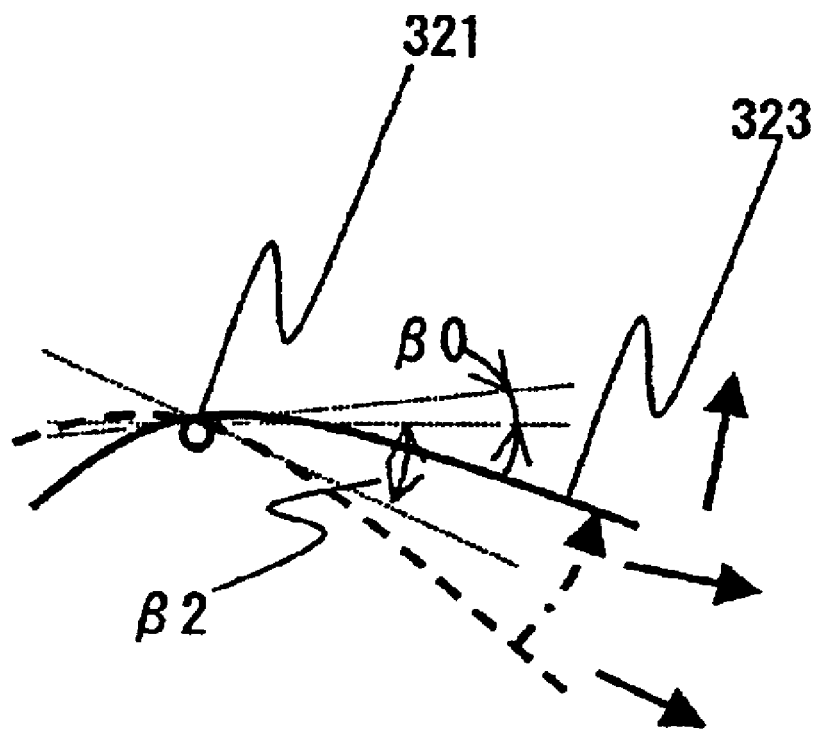

As a reaction of such flows of the fluid, forces opposite in direction to these flows act on the wing as a result, therefore in step S2 shown in FIG. 29, substantially upward fluid force is applied to the wing, and in step S4 shown in FIG. 31, mainly downward fluid force is applied to the wing.

In step S3 shown in FIG. 30, an up stroke is made with the torsion angle $\beta$ changed from $\beta_1$ to $\beta_2$ along the curve of the wing cross section. The angle of rotation of the wing in step S2 shown in FIG. 29 is larger than the angle of rotation of the wing in step S4 shown in FIG. 31. Therefore, in steps S2 and S4 also, the fluid force acting upward on the wing becomes stronger than the fluid force acting downward, and by time average, an upward fluid force acts on the wing.

In FIGS. 28 to 31, the attitude of the wing before movement in respective steps 1 to S4 is represented by the dotted line and the attitude after movement is represented by the solid line. The direction of movement of the wing in respective steps S1 to S4 is represented by the chain dotted arrow. The flow of fluid mainly generated in steps S1 to S4 is represented by solid arrows.

Figure 32:
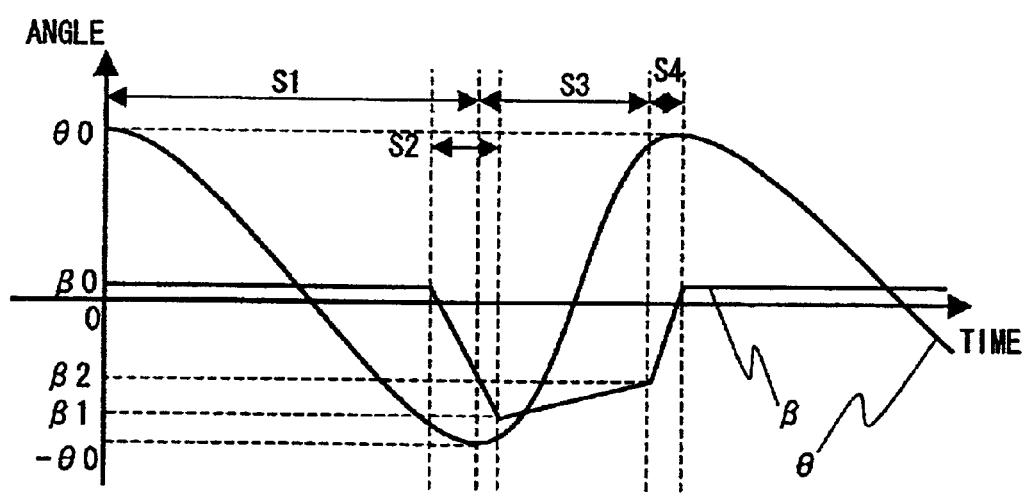
FIG. 32 is a first graph showing time dependency of stroke angle θ and torsion angle β of the second embodiment.

FIG. 32 is a graph representing the values of stroke angle $\theta$ and torsion angle $\beta$ as functions of time. In FIG. 32, it is noted that the ratios of the ordinates for the stroke angle $\theta$ and torsion angle $\beta$ are different.

In the experiment performed by the inventors, $\theta_0$ is, for example, 60°. The value $\beta_0$ is, for example, 0°, $\beta_1$ is $-120°$ and $\beta_2$ is $-70°$, for example. In the description, steps S1 to S4 are described as independent operations, for simplicity of description. An operation, however, is also possible in which the torsion angle of the wing is enlarged while the wing is moved downward in step S1. Further, the example described above comes from primary approximation, and the method of fluttering that actually enables rising is not limited thereto.

Though description has been made with respect to the left wing, the same applies to the right wing, by defining the stroke angle $\theta$, declination $\alpha$ and torsion angle $\beta$ for the left hand system, which is in mirror-symmetry with respect to the xz plane. In the following, the upward fluid force acting on the wing will be referred to as buoyancy force, and a forward fluid force acting on the wing will be referred to as propulsion.

(Method of Control)

The method of control enabling arbitrary motion of the fluttering apparatus will be described next. Here, the stroke angle $\theta$, declination $\alpha$ and torsion angle $\beta$ based on the right hand system will be used for the left wing and the stroke angle $\theta$, declination $\alpha$ and torsion angle $\beta$ based on the left hand system in mirror symmetry with respect to the xz plane are used for the right wing, of the fluttering apparatus to represent the attitude of the wings.

(Control Flow)

The flying movement by fluttering is realized by the fluid force exerted on the wing. Therefore, what is directly controlled by the wing motion is acceleration and angular acceleration applied to the fluttering apparatus.

Figure 37:
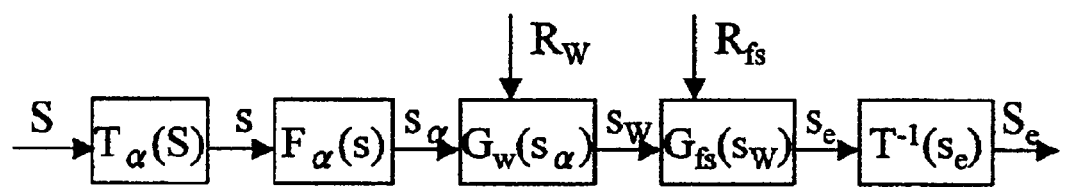
FIG. 37 is an illustration representing control functions for fluttering flight control.

First, the process through which an output Se is obtained from an input S is as shown in FIG. 37, where S represents difference between the target state of flight and the present state of flight, T(S) is a function representing conversion from the state of flight to acceleration and angular acceleration, s represents acceleration, angular acceleration F$\alpha$ (s) represents a function of a control algorithm including sensor response of acceleration sensor 51 and angular acceleration sensor 53, s$\alpha$ represents actuator control amount, $G_w$ (s$\alpha$) is a function representing response of actuator and the wing, sw represents wing motion, $G_{fs}$ $(_{sw})$ is a function representing acceleration or angular acceleration $s_e$ exerted on the fluttering apparatus by the wing motion, and Se represents change in the state of flight attained by the series of processes.

Actually, by the inertial force of the wing and the fluid, influences $R_w$ and $R_{fs}$ that depend on time history of the wing motion and the fluid motion so far are added to $G_W$ and $G_{fs}$.

(Division of Operation)

There is naturally a method of accurately calculating all functions other than F$\alpha$ to calculate control algorithm F$\alpha$ which realizes S=Se. For this method, time history of the fluid flow around the fluttering apparatus and the wing motion is necessary, which means that a formidable amount of data and high speed of arithmetic operation are necessary. The behavior resulting from the link between the fluid and the structure is so complicated that in most cases, the response would be chaotic, and hence such a method is impractical.

Therefore, a method in which basic operation patterns are prepared in advance, the target state of flight is divided and realized by time-sequentially combining the basic operation patterns is desired, as it is simple.

A motion of an object includes three translational degrees of freedom in z, y and z directions, and three rotational degrees of freedom in $\theta_x$, $\theta_y$ and $\theta_z$ directions, that is, 6 degrees of freedom. Namely, freedom in forward/backward directions, left/right directions and upward/downward directions as well as rotations in these directions.

Among these, the movement in left/right direction can be realized by combining rotation in the $\theta_z$ direction and movement in the forward/backward direction. Therefore, here, the method of realizing translational movement in the forward/backward direction, that is, along the x axis, translational operation in the upward/downward direction, that is, along the z direction and rotational operations about the x, y and z axes will be described.

(Operation)

(1) Operation in the Upward/Downward Direction (Along the z Axis)

As the wing moves, the force exerted by the fluid on the wing depends on the speed of movement of the wing, and therefore, in order to increase (decrease) the upward fluid force acting on the wing, possible options include A: to increase (decrease) amplitude of stroke angle $\theta$, and B: to increase (decrease) fluttering frequency.

By such operation, the fluttering apparatus may move upward (downward). Here, it is noted that the fluid force includes a negative value.

According to such approaches, the fluid force itself from the fluid to the wing increases. When there is any force exerted from a direction other than the upward/downward direction from the wing to the mechanical fulcrum of the wing as the fluid force is received by the wing from a direction other than the upward/downward direction, as the apparatus moves upward, the force acting on the fulcrum also increases in that direction. For example, when the apparatus is making a substantially uniform, forward linear motion and the fluttering frequency is increased, the fluttering apparatus moves upward with the velocity increased. In this manner, such a secondary motion occurs depending on the manner of fluttering at that time point. In the following, control from the hovering state will be described, unless noticed otherwise.

Further, the buoyancy force changes when the volume of the space in which the wing moves is changed by changing the torsion angle $\beta$ of the wing. For example, by setting an angle $\beta$ such that the volume of the space in which the wing moves in an up stroke is larger or the volume of the space in which the wing moves in a down stroke is smaller, the time average of the upward fluid force acting on the wing becomes smaller.

Actually, the wing is not a rigid body and it deforms. Therefore, the volume of the space in which the wing moves differ even when the angle $\beta$ is the same. According to the primary principle, the angle $\beta$ which is vertical to the direction of movement of the wing provides the largest volume of the space in which the wing moves. Further, the angle $\beta$ which is parallel to the direction of movement of the wing provides the smallest volume of the space in which the wing moves.

Here, secondary, the fluid force also acts in the direction vertical to the fluttering. If this action is of such a level that causes any problem in control, it becomes necessary to add wing motion that cancels such an action. It is realized, in the simplest manner, by changing the declination $\alpha$.

It is also possible to perform the operation along the z axis by changing the rotational angular speed of the wing in the above described step S2 or S4. For example, when the rotational angular speed ($-d\beta/dt$) of the wing is increased in step S2, downward flow rate of the fluid generated by the rotation increases, and by the reaction thereof, the upward fluid force acting on the wing increases.

Here, the torque of which axis of rotation is the main shaft of the wing, which acts on the fluttering apparatus, changes as a secondary result. Therefore, the change of the rotational angular speed should desirably be performed within such a range in that the change of the torque does not affect control.

Further, here the force in the forward/backward direction acting on the fluttering apparatus also changes as a secondary result. Therefore, if the change affects controlled flight, control of the force in the forward/backward direction should desirably be performed simultaneously, which will be discussed in item (2) below.

(2) Operation in the Forward/Backward Direction (Along the x Axis)

In the above described method of fluttering, the fluid force in the x direction acts on the wing mainly in steps S2 and S4. Therefore, by such an operation of the wing, the apparatus rises while moving forward.

When the declination a is increased in a down stroke and the wing is moved forward, a backward fluid force will act on the wing. Therefore, when the backward fluid force acting on the wing in step S1 is made larger than the forward fluid force mainly in the steps S2 and S4, the apparatus moves backward, and when the backward fluid force is made smaller, the apparatus moves forward, by controlling declination $\alpha$ in step S1, that is, in the down stroke. When these two forces are substantially balanced, the apparatus can stand still in the forward/backward direction.

Especially when the fluttering apparatus stands still in the forward/backward direction, the left and right wings perform substantially symmetrical motions and the gravity is balanced with the buoyancy force of the fluttering apparatus, hovering is possible.

As the vertical component of the fluid force acting on the wing changes as a secondary result of the change in declination $\alpha$, it becomes necessary to add wing motion that cancels this component, if the component is of such a level that affects control. This is mainly performed, in a simple manner, by the operation in the upward/downward direction described in item (1) above.

Further, when the angular velocity of rotational operation of the wing is increased in steps S2 and S4 described above, forward fluid force increases, and when it is decreased, the fluid force decreases. Thus, operation in the forward/backward direction can be changed.

Further, it is possible to utilize the component in the x direction of the secondary fluid force associated with the change in torsion angle $\beta$ of the wing described in item (1). More specifically, when $\beta>0$ in a down stroke, there is a forward force and when $\beta<0$, there is a backward force, on the apparatus.

Though the relation between each of $\beta$, $\alpha$ and $\theta$ in an up stroke is limited to some extent, the above described fluid force control is also possible in step S3.

(3) Rotational Operation with z Axis being the Axis of Rotation

By performing the control in the forward/backward direction described in item (2) separately for the left wing and the right wing to be different from each other, a torque can be applied to the fluttering apparatus.

More specifically, when the forward fluid force on the right wing is made higher than that of the left wing, the fluttering apparatus turns to the left with respect to the positive direction along the x axis, and when it is made lower, the apparatus turns to the right.

(4) Rotational Operation with x Axis being the Axis of Rotation

Similar to (3), when the upward fluid force of the right wing is increased to be larger than that of the left wing, the right side is lifted and when it is made smaller, the left side is lifted. Thus, rotational operation about the x axis as the axis of rotation is possible.

(5) Rotational Operation with y Axis being an Axis of Rotation

By changing the angular velocity of torsion angle $\beta$ of the wing described in (2), the torque about the y axis acting on the fluttering apparatus can be changed. Thus, rotational operation about the y axis as the axis of rotation is possible. For example, when the rotational angular velocity of torsion angle $\beta$ in step S1 is increased, the nose of the fluttering apparatus moves downward, and when it is decreased, the nose moves upward.

(6) Hovering

Figure 33:
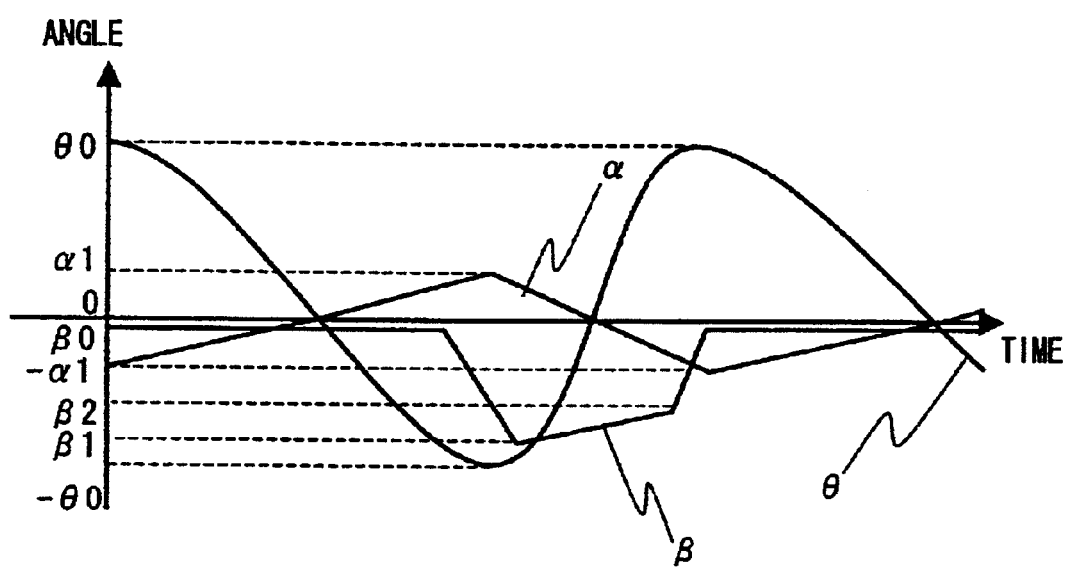
FIG. 33 is a second graph representing time dependency of the stroke angle θ and the torsion angle β of the second embodiment.

FIG. 33 is a graph representing the values of the stroke angle $\theta$, declination $\alpha$ and torsion angle $\beta$ when the fluttering apparatus is hovering, as functions of time. In FIG. 33, the ratio of the angles are different from that of the coordinate.

In the experiment performed by the inventors, by way of example, $\theta_0$ is 60°, $\beta_0$ is −10°, $\alpha_1$ is 30°, $\beta_1$ is −100° and $\beta_2$ is −60°.

FIG. 38 represents motions of the left wing in respective steps and acceleration and angular acceleration generated by the motions at the mechanical fulcrum A2 of the left wing. It is noted, however, that rotational operation about the x and z axes as axes of rotation discussed in (3) and (4) above are not shown. These operations are attained by asymmetrical motions of the left and right wings, as already described.

(Manner of Determining Control Method)

Figure 35:
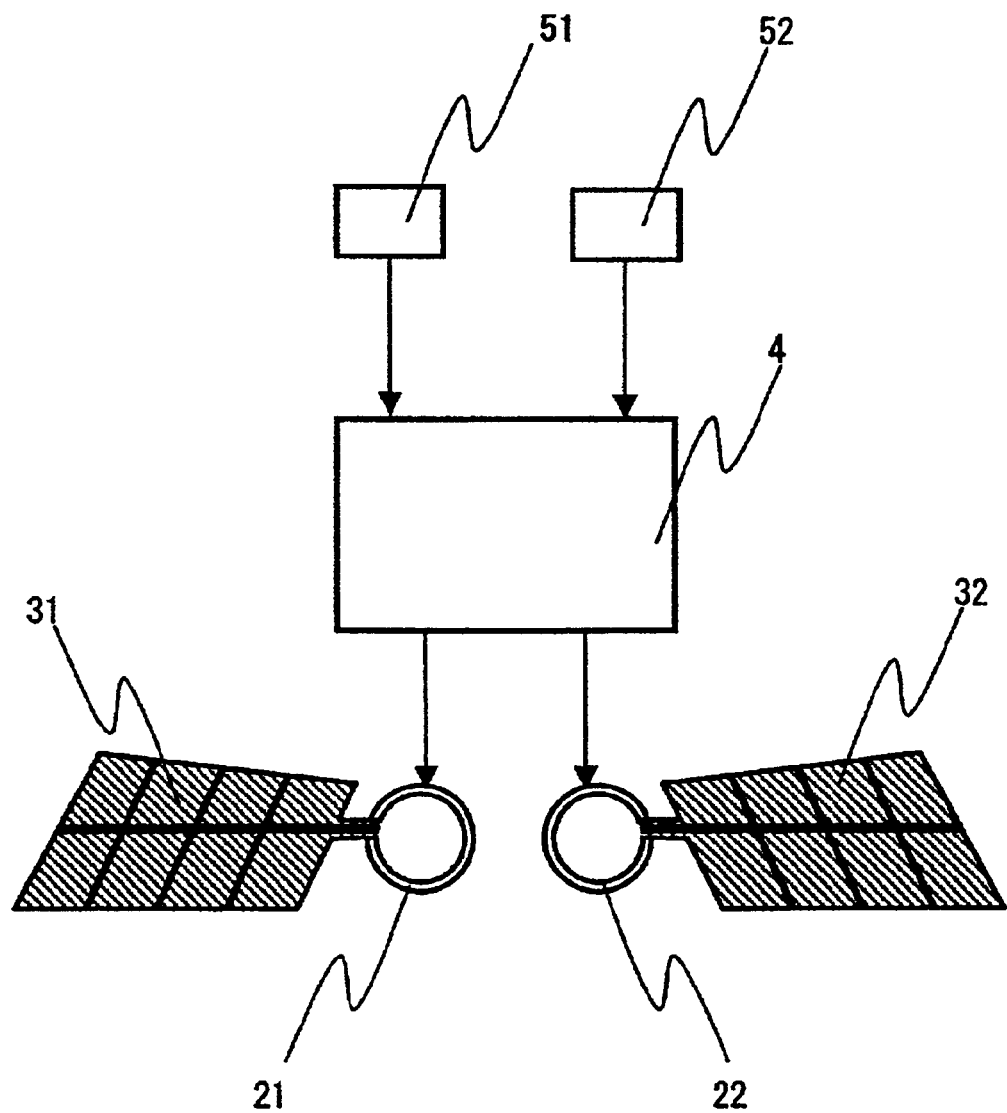
FIG. 35 is a block diagram representing main components of the fluttering apparatus in accordance with the second embodiment.

The present status of flight is found by using values that are provided by appropriately changing the values obtained by acceleration sensor 51 or angular acceleration sensor 52 mounted on the fluttering apparatus, as shown in FIG. 35. For example, the velocity can be calculated by applying an initial value of velocity to a value obtained by time-integration of acceleration. The position can be calculated by applying an initial value of position to the value obtained by time-integration of velocity. Further, it is also possible to use a method which includes time history of flying status, to find the status of flight.

Figure 34:
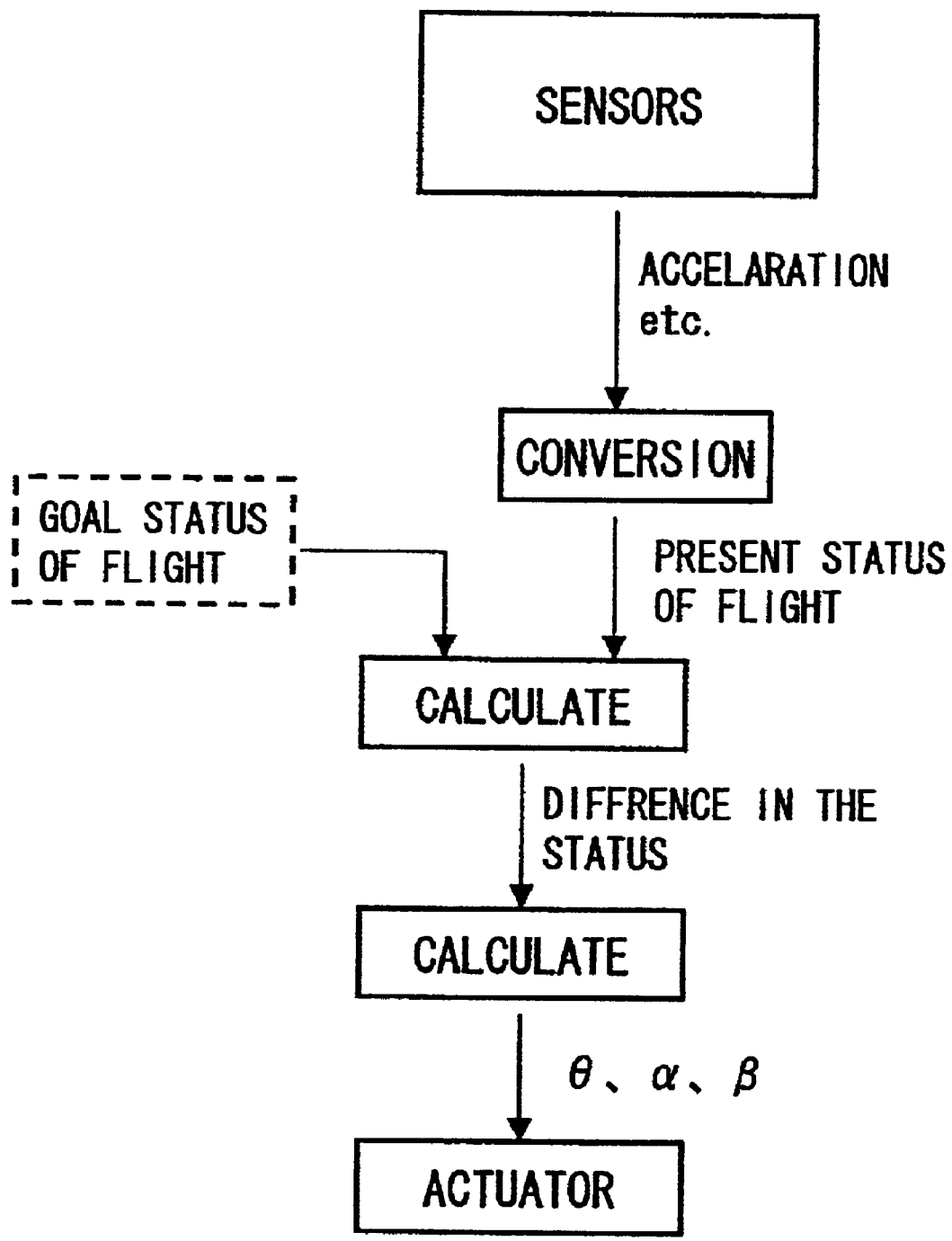
FIG. 34 is a flow chart representing data flow in the fluttering apparatus of the second embodiment.

As shown in FIG. 34, control apparatus 4 determines operation of the fluttering apparatus based on the current status of flight obtained from acceleration sensor 51 and angular acceleration sensor 52 and the target status of flight. Conventional control method is applicable to this control, except that the present control is in three dimensions.

The operation of the fluttering apparatus is converted by control apparatus 4 to driving of the actuators. This conversion may be realized at high speed when table reference or complementation thereof is used. For example, basic operations and combinations of actuator drivings realizing the operations are prepared in advance, as shown in FIG. 39. In FIG. 39, the leftmost column represents target operation. Fluttering patterns A and B represent the pattern of fluttering for forward movement and for hovering, respectively, which are, more specifically, time-discrete time histories of $\alpha$, $\beta$ and $\theta$ represented in the graphs of FIGS. 32 and 33. Control apparatus 4 calculates the drive or the complemented drive from the table, based on the operation of the fluttering apparatus.

Here, a method in which the operation of the fluttering apparatus is calculated and converted to actuator drive is used for convenience of description. It is also possible, however, to select driving of actuator directly from the status of flight.

For static control, for example, a method is possible in which of the actuator drives described above or complementation thereof may directly be calculated.

It is needless to say that physical amount representing the status of flight of the fluttering apparatus is not limited to the position, velocity, acceleration and the like mentioned above. Further, the method of determining actuator drive is not limited to those described above.

It is possible for the fluttering apparatus to reach the target position while appropriate changes are made, by the above described control method.

(Weight That can be Lifted)

In the fluttering apparatus of the inventors, stator 210 is comparable to ultrasonic motor 23. Therefore, the torque with respect to the motion in $\theta$ direction is 1.0 gf·cm. Therefore, the inventors calculated the fluid force when the apparatus flutters with its torque, through simulation.

The size of the wing was a rectangular having longer side of 4 cm×shorter side of 1 cm. The longer side is in the direction away from the actuator. Deformation of the wing was neglected. As the mass of wing of a dragonfly having the width of 8 mm and the length of 33 mm was about 2 mg, the mass of the wing was made 3 mg, based on the value.

The ultrasonic motor drives a rotor by a small elliptical motion at the tip end portion of the projections. Therefore, rise and fall of the actual driving torque is in the order of the period of the elliptical motion, that is, the order of 100 kHz. However, because of limitation from calculation stability, it was set to ±250 gf·cm/sec.

Figure 36:
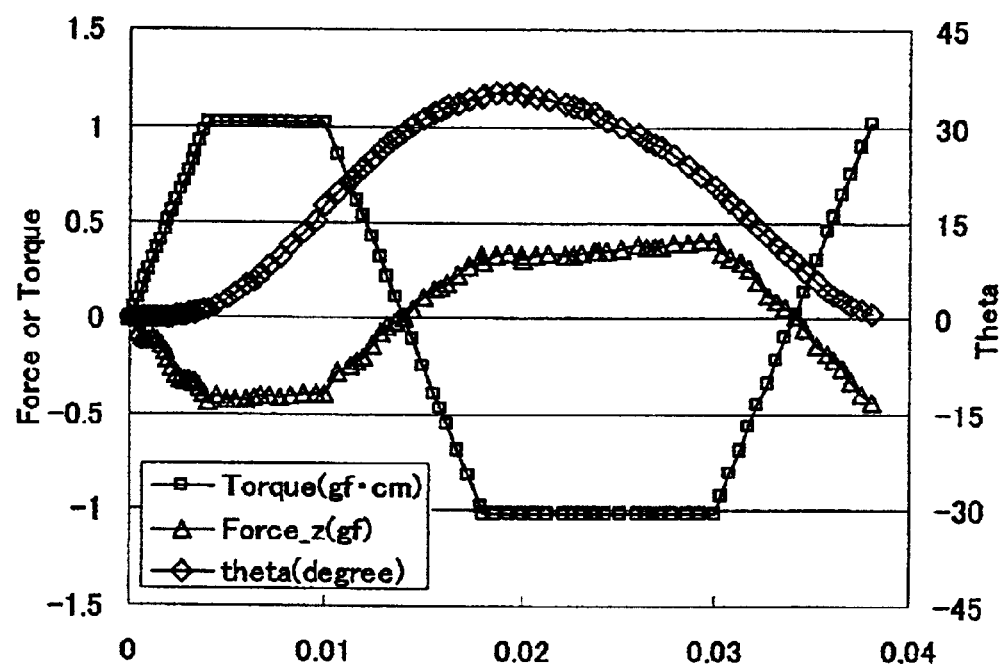
FIG. 36 is a graph showing change with time of fluttering torque, fluttering movement (stroke angle θ) and supporting reaction of the second embodiment.

One shorter side of the wing is fixed, leaving only the rotational degree of freedom with this side being the axis of rotation, the torque is applied to the axis of rotation, and reaction on the axis of rotation was calculated. The result is as shown in FIG. 36. Here, declination $\alpha$ is 0° and torsion angle $\beta$ is also 0°.

Referring to FIG. 36, at time 0 sec, the wing is horizontal (stroke angle $\theta=0°$). The torque value is substantially linearly increased to 1 gf·cm from time 0 to 0.004 sec. From the time point 0.004 sec to 0.01 sec, the torque value is kept at 1 gf·cm. From 0.01 sec to 0.018 sec, the torque value is substantially linearly changed from 1 gf·cm to −1 gf·cm. From time point 0.018 sec to 0.03 sec, the torque value is kept at −1 gf·cm. From time 0.03 sec to 0.038 sec, the torque value is substantially linearly changed from −1 gf·cm to 1 gf·cm.

Time average of the fulcrum reaction during a down stroke obtained by the application of such a torque was about 0.29 gf. The period during the down stroke means that the time period in which the torque is negative, and more specifically, it is from the time point 0.014 sec to the time point 0.034 sec.

As the simulation provides the result of fluttering operation with one degree of freedom, the action of the fluid force in an up stroke is unknown. Th resistance of the fluid, however, decreases as compared with the cross section, and therefore, considering the fact that the downward fulcrum reaction acting in the up stroke is small, the time of action of the force is relatively short and that buoyancy force can also be obtained by wing rotation or the like in addition to that down stroke, it is considered possible to lift an object having the mass of about 0.29 g, by using an actuator having the torque of 1 gf·cm.

More specifically, when the mass of the entire fluttering apparatus is made at most 0.58 g, the fluttering apparatus can be lifted. The mass of the fluttering apparatus will be considered in the following.

First, stator 210 is comparable to a disc having the specific gravity of 2.7, thickness of 0.4 mm and the radius of 4 mm, as the electrode and the piezo-electric elements are thin. Namely, the stator 210 has the mass of 0.054 g. The mass of the auxiliary stator is 0.019 g, as the diameter of the stator is 0.7 times the diameter of stator 210.

Three bearings are each a doughnut shaped ball bearing having the outer diameter of 4.2 mm, inner diameter of 3.8 mm and the thickness of 0.4 mm. The material of the bearing is titanium having the specific gravity of 4.8. As the bearing has an opening of about 30%, the mass of the bearing is about 0.013 g.

The material of rotor 219 is aluminum, and the rotor has wall center radius of 3 mm and the thickness of 0.2 mm. Therefore, the mass of rotor 219 is about 0.061 g. In total, the mass of actuator 21 is 0.192 g.

The mass of the wing is, as already mentioned, 0.003 g. As one actuator and one wing are provided on each of the left and right portions of the fluttering apparatus, the mass of these in the fluttering apparatus as a whole will be 0.390 g.

Further, the support structure 1 of the fluttering apparatus is a sphere having the diameter of 1 cm, specific gravity of 0.9 and the thickness of 0.1 mm. Therefore, the mass of support structure 1 is about 0.028 g.

Control apparatus 4, acceleration sensor 51 and angular acceleration sensor 52 are each formed by a semiconductor barechip of 5 mm×5 mm, of which mass is about 0.01 g. Therefore, the total mass of control apparatus 4, acceleration sensor 51 and angular acceleration sensor 52 is about 0.03 g. The mass of the power source 6 mounted on the fluttering apparatus is 0.13 g.

From the foregoing, the mass of the fluttering apparatus is 0.578 g. The buoyancy force obtained by one pair of wings is 0.58 gf. Therefore, the fluttering apparatus can be lifted.

The weight power density as will be described below is required of the power source 6. First, the maximum power consumption by the left and right actuators of the fluttering apparatus is, in total, 40 mA. Power supply voltage is 3V. As the weight of electrolyte is 0.1 g, the power source 6 must have the weight power density of 0.12 W/0.1 g, that is, 1200 W/kg.

A commercially available lithium ion polymer secondary battery, for example, has the weight power density of about 600 W/kg. This value is for a product having the weight of 10 g or heavier, used in an information equipment such as a portable telephone.

Generally, the ratio of electrode area with respect to the weight of electrolyte is in inverse proportion to the size of the power source. The power source 6 mounted on the fluttering apparatus has the ratio of electrode area larger by ten times or more than the secondary battery used in an information equipment mentioned above. Therefore, power source 6 has about ten times the weight power density of such a secondary battery, and hence, can have the aforementioned weight power density. Assuming that the weight of electrolyte of power source 6 is about 0.1 g, the fluttering apparatus is capable of a flight for about 7.5 minutes. Among fuel cells, some can attain higher weight power density than the lithium ion polymer secondary battery. Such cells may naturally be used, provided that the condition allowing flight such as mass is satisfied.

There is a concern of heat generated by the fluttering operation of the wing. Assuming that the material for the actuator is aluminum and specific heat thereof is 0.215 cal/(g·° C.), the increase in temperature is 0.35° C. when all the energy supplied to the actuator is converted to heat (energy conversion efficiency 0%), and 0.24° C. when 70% of the supplied energy is converted to heat.

Actually, the heat generated in the flattering apparatus will be radiated from the fluttering apparatus. Consider an optical disk having the thickness of about 6 mm. When a surface of the optical disc is continuously irradiated with laser beam of about 6 mW, the temperature rises to about 100° C. in average in an elliptical area of about 1 $\mu$m×10 $\mu$m on the surface of the optical disc. At a position several $\mu$m deep from the surface, however, the temperature is almost as low as the ambient temperature of the optical disc.

Therefore, the energy of about 60 mW cannot even by 1° C. increase the temperature of an actuator in the order of millimeters.

(Others)

Though polyethylene terephthalate (PET) formed substantially as a spherical shell has been described as an example of the support structure 1 of the fluttering apparatus, the material and shape are not limited to these. Further, the arrangement of actuators and shape of the wing are not limited to those shown in FIG. 17, provided that the flight performance is ensured.

Particularly, in the fluttering apparatus, the center of gravity is positioned lower than the mechanical point of application of the wing so that the apparatus naturally assumes the attitude shown in FIG. 17, putting higher priority on stability. However, the difference in fluid force between the left and right wings necessary for attitude control becomes smaller when the position of the center of gravity matches the position of the mechanical point of application, and hence, the attitude of the fluttering apparatus can be changed more easily.

In the fluttering apparatus, the position and attitude of the fluttering apparatus are detected by an acceleration sensor and an angular acceleration sensor. The sensors are not limited to these, and any means may be used that can measure the position and attitude of the fluttering apparatus.

For example, at least two acceleration sensors that can measure acceleration along three axial directions orthogonal to each other may be arranged at different positions of support structure 1, and based on acceleration information provided by the acceleration sensors, the attitude of the fluttering apparatus may be calculated. Alternatively, a magnetic field distribution may be provided in the space in which the fluttering apparatus moves, and the position and attitude of the fluttering apparatus may be calculated by detecting the magnetic field distribution using a magnetic sensor.

Though sensors including acceleration sensor 51 and angular acceleration sensor 52 are shown as components separate from control apparatus 4, the sensors may be formed integrally with and on the same silicon substrate as control apparatus 4 by micromachining technique, in order to reduce weight.

Though the drive of the wing is open-loop controlled in the fluttering apparatus, an angle sensor of the wing may be provided at the root of the wing, and closed loop control may be performed using the angle information obtained from the angle sensor.

Further, when the flow of the fluid in the space in which the apparatus flies is known and the flight is possible by a predetermined method of fluttering, the sensors mentioned here are not essential.

Though the wing is directly driven by an ultrasonic element using progressive wave in the fluttering apparatus, the structure for driving the wing and types of the actuator are not limited to those described above. For example, a fluttering apparatus using a combination of an exoskeleton structure and a linear actuator such as disclosed in Japanese Patent Laying-Open No. 5-169567 may be possible.

Though electric power is used as the driving energy, it is possible to use internal combustion engine. Further, an actuator utilizing physiological oxidation-reduction reaction such as recognized in the muscle Of insects may be used. The driving energy for the actuator may be externally obtained. For example, a thermister (therminoic element), electromagnetic wave or the like may be used for the electric power.

The fluttering apparatuses according to the first and second embodiments can fly apart from the ground, and therefore, the trade-off between the capability of overcoming a step and the capability of passing through a small space can be eliminated.

For example, in a general household, obstacles positioned at about the height of one's eyes (about 1.5 m) such as a large piece of furniture or an air conditioner are in most cases fixed in its position. Air conditioners, illuminating equipment and the like are fixed on a wall or ceiling, and such equipment is not moved generally.

Therefore, when the fluttering apparatus flies in a zone (space) where there is a small number of obstacles and the positions of the obstacles hardly change, the fluttering apparatus can freely move through the household, not hindered by the obstacles. Further, as it flies, even a small fluttering apparatus can overcome a high step or an obstacle.

Further, the apparatus is capable of hovering in the air, and therefore, it is suitable for moving a space that is relatively narrow and contains a number of obstacles, such as a general household. Thus, a prescribed operation such as monitoring the state within the household can be readily attained.

Further, as can be observed in the free flight of insects, by changing the declination or torsion angle of the wing, the direction of movement of the fluttering apparatus can quickly be changed, and hence the apparatus has superior maneuverability as compared, for example, with a helicopter.

Further, the buoyancy force of the fluttering apparatus does not directly depend on the volume thereof, and hence it is suitable for reduction in size as compared with a moving apparatus such as a balloon of which buoyancy force is in proportion to the volume.

Further, the fluttering apparatus can be used outdoors, and it can move not hindered by the geometry or obstacles outdoors. Therefore, it can easily collect information of such a place that cannot be readily accessed, for example, at a disaster site.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A moving apparatus, comprising:
   a flying body, including
      a wing portion for fluttering in a space in which a fluid exists,
      a driving portion for performing a down stroke in which said wing portion is moved downward from above and an up stroke in which said wing portion is moved upward from below, and
      a main body to which said wing portion is attached and said driving portion is mounted; wherein
      by time average for the series of said down stroke and said up stroke, vertically upward force received by said wing portion from said fluid is larger than gravity acting on said flying body, and wherein said moving apparatus has means for moving backward by one fluttering motion.

2. The moving apparatus according to claim 1, wherein volume of said space in which said wing moves in said down stroke is larger than the volume of said space in which said wing moves in said up stroke.

3. The moving apparatus according to claim 1, wherein said flying body is used as moving means for performing a prescribed operation indoors.

4. The moving apparatus according to claim 1, wherein said flying body is used as moving means for performing a prescribed operation outdoors.

5. The moving apparatus according to claim 1, wherein each wing of said wing portion has
   a wing body portion, and
   a wing shaft portion supporting said wing body portion; and wherein
   said driving portion changes a torsion angle formed by a tip end of each wing of said wing body portion and a prescribed reference plane, by driving its associated wing shaft portion.

6. The moving apparatus according to claim 5, wherein said driving portion makes said torsion angle in said down stroke different from said torsion angle in said up stroke.

7. The moving apparatus according to claim 5, wherein said driving portion changes with time said torsion angle.

8. A moving apparatus, comprising:
   a flying body, including
      a wing portion for fluttering in a space in which a fluid exists,
      a driving portion for performing a down stroke in which said wing portion is moved downward from above and an up stroke in which said wing portion is moved upward from below, and
      a main body to which said wing portion is attached and said driving portion is mounted; wherein
      by time average for the series of said down stroke and said up stroke, vertically upward force received by said wing portion from said fluid is larger than gravity acting on said flying body, and wherein
   said wing portion has
   a wing body portion, and
   a wing shaft portion supporting said wing body portion; wherein
   said driving portion changes a torsion angle formed by a tip end of said wing body portion and a prescribed reference plane, by driving said wing shaft portion; and wherein
   said wing shaft portion includes one wing shaft portion and the other wing shaft portion; and
   said wing body portion includes a film portion formed spreading across said one wing shaft portion and said the other wing shaft portion separately.

9. The moving apparatus according to claim 8, wherein said one wing shaft portion and the other wing shaft portion are formed such that a space therebetween is enlarged toward tip ends of said one wing shaft portion and said the other wing shaft portion.

10. The moving apparatus according to claim 8, wherein said one wing shaft portion and said the other wing shaft portion are pivotable about the respective axes of said one wing shaft portion and said the other wing shaft portion.

11. The moving apparatus according to claim 1, wherein a target manner of movement is realized by time-sequentially combining basic operations in accordance with basic operations pattern data.

12. The moving apparatus according to claim 11, comprising storing means for storing combination of said basic operations pattern data and driving manner data related to the manner of driving said driving portion realizing said basic operations pattern data.

13. A moving apparatus, comprising:
   a flying body having a center of gravity, said flying body including
      a wing portion for fluttering in a space in which a fluid exists, a driving portion for performing a down stroke in which said wing portion is moved downward from above and an up stroke in which said wing portion is moved upward from below, and
      a main body to which said wing portion is attached and said driving portion is mounted; wherein
      by time average for the series of said down stroke and said up stroke, vertically upward force received by said wing portion from said fluid is larger than gravity acting on said flying body, and wherein
   said moving apparatus controls both of at least one of fluttering frequency and fluttering angle and the relationship between the position of the center of gravity thereof and the plane of fluttering motion.

14. The moving apparatus according to claim 13, wherein volume of said space in which said wing moves in said down stroke is larger than the volume of said space in which said wing moves in said up stroke.

15. The moving apparatus according to claim 13, wherein said flying body is used as moving means for performing a prescribed operation indoors.

16. The moving apparatus according to claim 13, wherein said flying body is used as moving means for performing a prescribed operation outdoors.

17. The moving apparatus according to claim 13, wherein each wing of said wing portion has a wing body portion, and a wing shaft portion supporting said wing body portion; and wherein said driving portion changes a torsion angle formed by a tip end of each wing of said wing body portion and a prescribed reference plane, by driving its associated wing shaft portion.

18. The moving apparatus according to claim 17, wherein said driving portion makes said torsion angle in said down stroke different from said torsion angle in said up stroke.

19. The moving apparatus according to claim 17, wherein said driving portion changes with time said torsion angle.

* * * * *